US008132461B2

(12) United States Patent
Clasen et al.

(10) Patent No.: US 8,132,461 B2
(45) Date of Patent: Mar. 13, 2012

(54) ICE THICKNESS MEASURING SYSTEM

(75) Inventors: Mark Clasen, Isanti, MN (US); Orrin Milo McGill, Andover, MN (US); Philip Eric Erickson, Sandstone, MN (US); Ernest L. Tell, St. Paul, MN (US)

(73) Assignee: Prec"ICE" Technology, Inc., Isanti, MN (US)

( * ) Notice: Subject to any disclaimer, the term of this patent is extended or adjusted under 35 U.S.C. 154(b) by 1029 days.

(21) Appl. No.: 12/077,469

(22) Filed: Mar. 19, 2008

(65) Prior Publication Data

US 2008/0295599 A1   Dec. 4, 2008

Related U.S. Application Data

(60) Provisional application No. 60/918,829, filed on Mar. 19, 2007.

(51) Int. Cl.
*G01H 3/12* (2006.01)
(52) U.S. Cl. .......................................... 73/599; 702/171
(58) Field of Classification Search .................... 73/599, 73/598, 600, 627, 597; 702/171, 39, 56, 702/170
See application file for complete search history.

(56) References Cited

U.S. PATENT DOCUMENTS

| | | | | |
|---|---|---|---|---|
| 3,665,466 A | | 5/1972 | Hibbard | |
| 4,388,830 A | * | 6/1983 | Narushima et al. | 73/597 |
| 4,398,421 A | * | 8/1983 | White | 73/597 |
| 4,628,736 A | * | 12/1986 | Kirby et al. | 73/590 |
| 5,095,754 A | * | 3/1992 | Hsu et al. | 73/602 |
| 5,313,202 A | * | 5/1994 | Hansman et al. | 340/962 |
| 5,381,694 A | * | 1/1995 | Glynn et al. | 73/627 |
| 5,474,261 A | * | 12/1995 | Stolarczyk et al. | 244/134 F |
| 5,507,183 A | * | 4/1996 | Larue et al. | 73/598 |
| 5,523,959 A | * | 6/1996 | Seegmiller | 702/130 |
| 5,557,047 A | | 9/1996 | Koide | |
| 5,585,551 A | * | 12/1996 | Johansson et al. | 73/64.53 |
| 5,772,153 A | * | 6/1998 | Abaunza et al. | 244/134 F |

(Continued)

FOREIGN PATENT DOCUMENTS

EP    0 298 165 A1    11/1989

(Continued)

OTHER PUBLICATIONS

"Becker Arena Products to Distribute the PrecIce Technologies New IceTec IT8 Electronic Ice Depth Measuring Tool," Jan. 31, 2008.*

(Continued)

*Primary Examiner* — Hezron E Williams
*Assistant Examiner* — Samir M Shah
(74) *Attorney, Agent, or Firm* — Patterson, Thuente, Christensen, Pedersen, P.A.

(57) ABSTRACT

An ice thickness measurement system for determining thicknesses of an ice sheet such as an ice rink that is positioned on a solid or granular substrate. The system determines the thickness of the ice sheet using an acoustic technique, is portable, and may include a display graphic or graphical user interface on the portable unit to direct operators of the unit where to conduct an array of measurements on the ice sheet. The system may also be compatible with a computer for downloading of data and uploading of graphical displays.

2 Claims, 21 Drawing Sheets

U.S. PATENT DOCUMENTS

| | | | |
|---|---|---|---|
| 6,010,095 A * | 1/2000 | Hackmeister | 244/134 F |
| 6,049,282 A * | 4/2000 | MacKenzie | 340/583 |
| 6,324,911 B1 | 12/2001 | Scarffe | |
| 6,731,225 B2 * | 5/2004 | Vopat | 340/962 |
| 7,095,359 B2 * | 8/2006 | Matsuoka et al. | 342/26 R |
| 2003/0169186 A1 * | 9/2003 | Vopat | 340/962 |
| 2004/0187357 A1 * | 9/2004 | Piril | 37/196 |
| 2007/0187119 A1 * | 8/2007 | Fawcett | 172/35 |

FOREIGN PATENT DOCUMENTS

| | | |
|---|---|---|
| EP | 1 336 564 A2 | 8/2003 |
| JP | 06058912 A | 4/1994 |

OTHER PUBLICATIONS

Tervalon et al., "Ice Profiling Sonar for an AUV an approach for obtaining SCICEX quality ice draft data," (earlier than Fall 2001).*
"Ice thickness detector mulling," Oct. 14, 2002.*
Fowler et al., "Theory and Application of Precision Ultrasonic Thickness Gaging" NDTnet, Oct. 1997, vol. 2, No. 10.
"Ultrasonic Transducers Technical Notes" Olympus, 2006.
K.U. Ingard, "Fundamentals of Waves and Oscillations" Acoustic waves in fluids, p. 298.
General Purpose Thickness Gauge PocketMIKE, by StressTel, Integrated instrument and transducer for true single-hand operation.

* cited by examiner

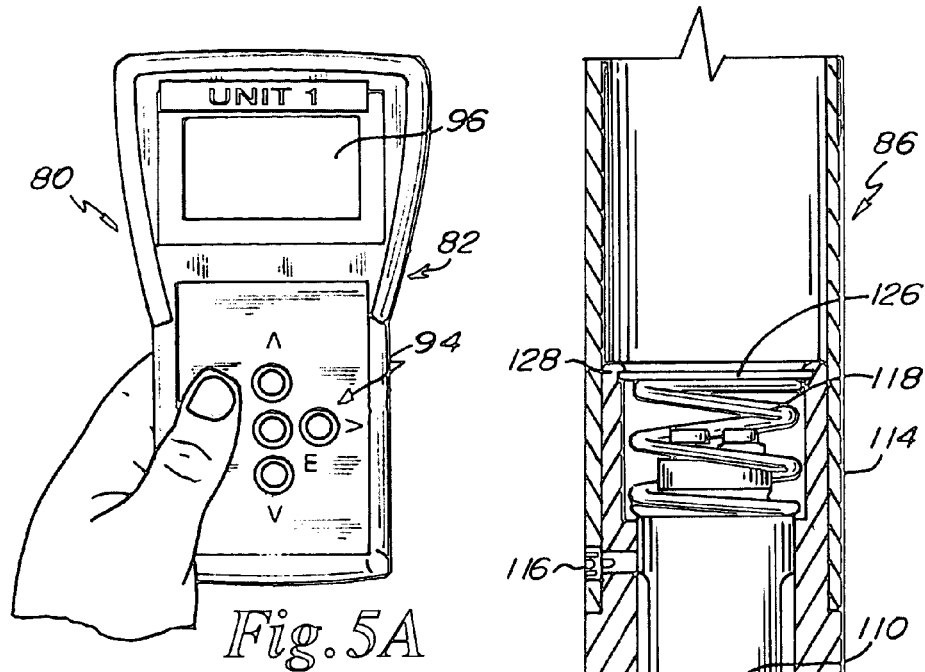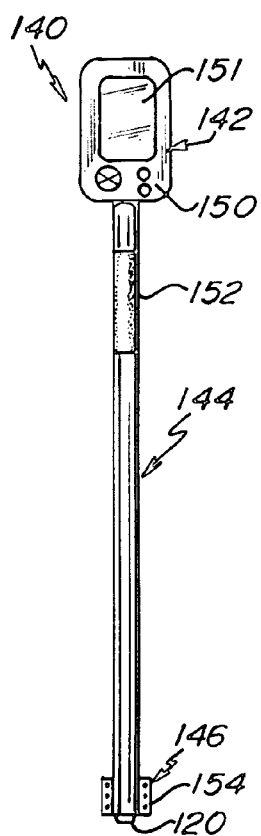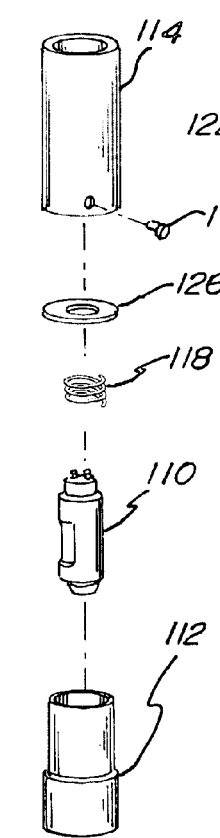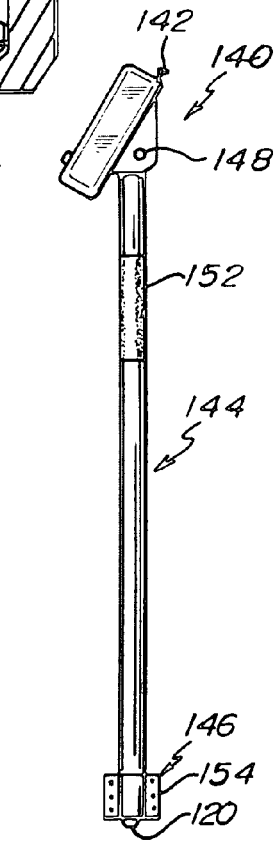

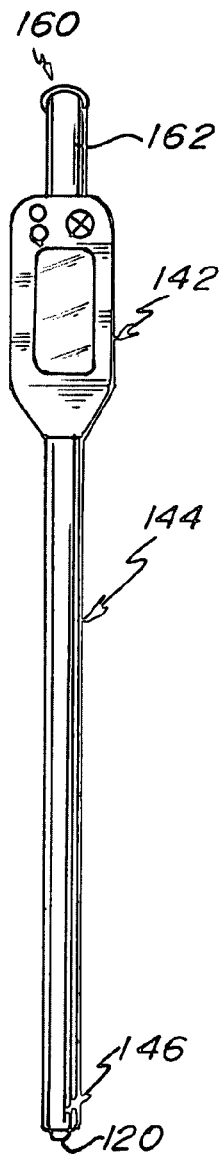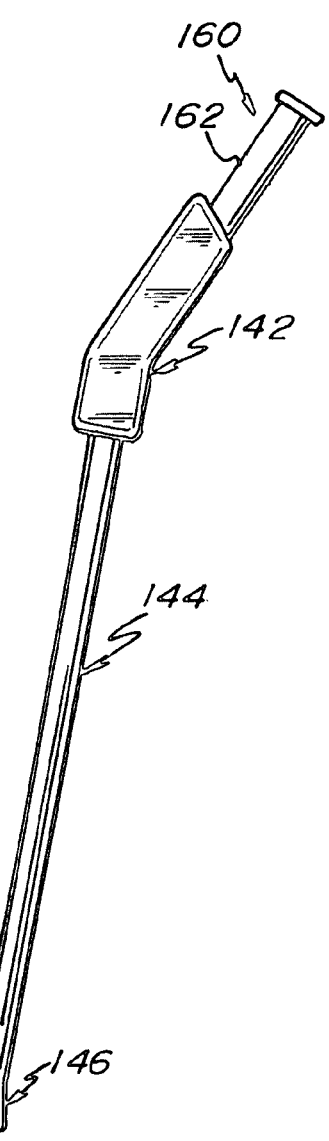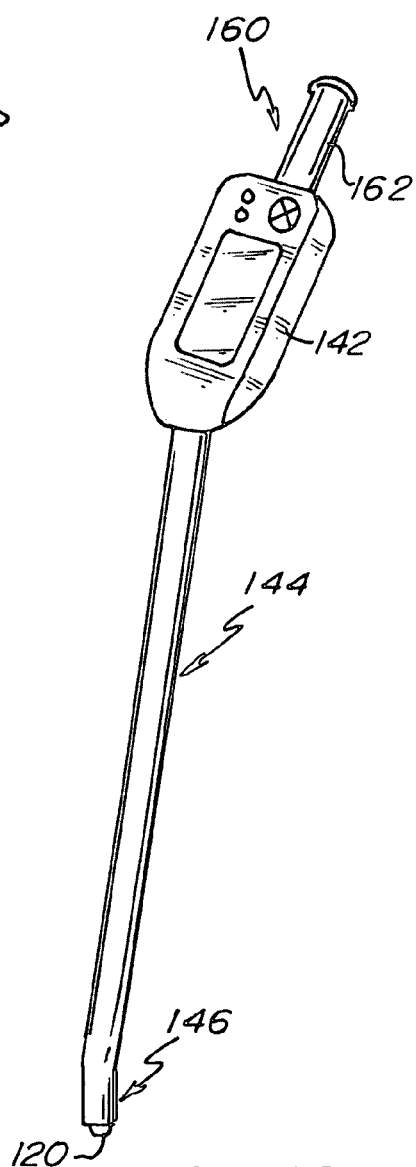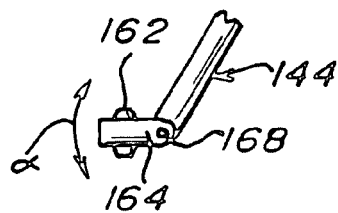
Fig. 11.  Fig. 12  Fig. 13
Fig. 14

ICE THICKNESS MEASURING SYSTEM

RELATED APPLICATIONS

This application claims the benefit of U.S. Provisional Application No. 60/918,829 filed Mar. 19, 2007, and which is hereby incorporated by reference in its entirety.

COMPACT DISK

A compact disc containing codes and information describing a preferred embodiment of the present invention is submitted herewith and is hereby incorporated by reference. The compact disc contains the following files and/or programs:

| Title | Size in Bytes | Date of Creation |
|---|---|---|
| fonts.c | 266,040 | Mar. 14, 2008 |
| fonts.h | 2,367 | Mar. 14, 2008 |
| global.h | 164 | Mar. 14, 2008 |
| Ice Gauge.c | 57,262 | Mar. 14, 2008 |
| Ice Gauge.h | 11,629 | Mar. 14, 2008 |
| Ice Gauge.PJT | 1,202 | Mar. 14, 2008 |
| lcd128x64.c | 25,398 | Mar. 14, 2008 |
| lcd128x64.h | 5,884 | Mar. 14, 2008 |
| 8 files; 369,946 bytes | | |
| Total: 8 files; 369,946 bytes | | |

TECHNICAL FIELD

The present disclosure relates generally to the measurement of thickness. More particularly, the disclosure relates to the non destructive measurement of an ice sheet situated on a solid or granular substrate.

BACKGROUND OF THE DISCLOSURE

The maintenance of the thickness of ice is an important consideration in the management of commercial skating rinks. For indoor skating facilities, the ice is maintained preferably at a targeted thickness of approximately 25- to 40-mm (1.0- to 1.5-in.) and a temperature of −7 to −4° C. (20 to 24° F.). An ice sheet with a thickness that is substantially below this target range is at risk to break apart, with the possible consequence of injuring participants or postponing, delaying or canceling an event. The importance of maintaining ice at an appropriate thickness has led the National Hockey League (NHL), for example, to require NHL rink managers to report the ice thickness before and after each game. Recently, the National Collegiate Athletic Association (NCAA) has mandated that a survey of the ice thickness of the ice sheet at tournament venues be measured before each tournament game.

As the thickness increases substantially above the targeted thickness, the surface temperature of the ice may become undesirably high due to the conductive temperature gradient through the ice thickness. The skating surface may thereby become unduly soft and adversely affect the performance of participant skaters. The temperature of an overly thick ice sheet may be brought into the preferred temperature range by further sub-cooling the ice sheet, but this requires additional expenditure in refrigeration costs.

Ice thickness is also a factor in the management of outdoor rinks. Safety remains a factor in the maintenance of passively cooled rinks. Furthermore, refrigeration cooled outdoor rinks are becoming more common, and are subject to the same safety and energy consumption metrics as with indoor rinks.

An accepted practice for the measurement of ice thickness at commercial or municipal skating facilities is to drill a hole through the ice until the bit contacts the substrate below, temporarily mark the bit flush with the upper surface of the ice sheet, remove the bit, measure the distance between the tip of the bit and the temporary mark with a ruler or tape measure, and record the result on a sheet of paper. The procedure is repeated at several points on the ice sheet. The procedure is time consuming and labor intensive, and prone to the errors from a variety of sources including drilling the hole too deep (inadvertent penetration of the substrate) or not deep enough (sensing compacted ice rather than concrete), erroneously marking the drill bit, misreading of the tape or ruler, and the erroneous recording of the thickness measurement. Furthermore, in some instances the hole may cause local stress gradients that may cause the ice surface to pock under the rigors of use, thereby causing a hazard.

Moreover, the marked drill bit technique is not readily applicable to all ice facilities. Rink floors are typically configured in one of three ways. A first configuration is to imbed refrigeration piping in a concrete slab, thus enabling the venue to be utilized for purposes other than skating by merely melting the ice and draining off the water residual. A second configuration, appropriate for dedicated ice rinks, is to imbed refrigeration piping in a sand or granular substrate. A third configuration involves laying the refrigeration piping exposed on a substrate (concrete, granular, earthen or otherwise) and flooding the floor for direct contact between the ice and the refrigeration piping. An example is the so-called "mat system," wherein long, narrow banks of refrigeration piping (e.g. 1-m wide by 15-m long) are laid out side by side and hooked to a common refrigeration supply header. This type of configuration finds utility for seasonal venues, where the rink is dismantled at the end of a season.

The marked drill bit technique is generally or variably applicable only to the first configuration. For the second configuration, the operator cannot reliably detect when the ice sheet has been penetrated. For the third configuration, even where a floor of sufficient hardness is implemented, there is a danger of damaging the refrigeration piping. As a workaround, operators of sand bottom facilities may install metal plates or concrete blocks at select locations on the substrate for the purpose of receiving the tip of the drill bit during in a measurement check. Operators of surface installed refrigeration may carefully select and mark locations where the piping will not be damaged. However, subsequent measurements are limited, and inspection of thickness in areas away from the pre-selected locations cannot be performed.

The implementation of acoustical devices in the measurement of ice thickness is known. Hereinafter, "acoustic" or "acoustical" refers generally to the acoustic spectrum, including infrasound, audible sound and ultrasound. See Ingard, "Fundamentals of Waves and Oscillations," p. 298 (1988: Cambridge University Press). A body of literature exists, for example, disclosing devices and techniques for the detection of ice build up on vehicles or vehicle components such as aircraft members. U.S. Pat. No. 4,628,736 to Kirby et al. describes an apparatus and method wherein the reflection of transmitted acoustic waves through a thickness of ice on a vehicle member is transmitted from the vehicle member through the ice to the ice/air interface, where a portion of the acoustic signal is reflected back to the vehicle member for detection by a receiver. U.S. Pat. No. 5,095,754 to Hsu, et al. further discloses an improvement to this technique that enables the discernment of water at the air interface. U.S. Pat.

No. 5,507,183 to Laure et al. compares an "uncontaminated" reflected signal through a vehicle member to a delayed "contaminated" signal reflected off the ice/air interface in making the thickness determination. U.S. Patent Application Publication No. 2003/0169186 to Vopat measures the composite thickness (ice and aircraft member) and discloses a method for subtracting the aircraft member thickness from the composite thickness to arrive at the ice thickness. What is common to the disclosures above is that the transmitting and receiving devices are imbedded in a dedicated application, and the thickness of the ice is determined from the bottom up, thereby relying on the ice/air or water/air interface to deliver a detectable reflected signal.

U.S. Pat. No. 5,557,047 to Koide discloses a thickness measuring device wherein a transmitter and a receiver are situated on one face of a medium and a reflector is situated on the opposing face of the medium. Kiode's measurement technique involves the measurement multiple reflections back and forth through the medium resulting from a single pulsed input, and is not well suited for configurations where the reflector highly attenuates the signal (e.g. a sand or granular substrates, or certain concrete or asphalt substrates).

Products exist on the market that provide an ultrasonic thickness measurement in a portable package. An example is the POCKETMIKE general purpose thickness gauge marketed by GE Inspection Technologies. Such devices are compact, portable and generally applicable to the thickness measurement of an ice medium. However, such devices suffer from a number of drawbacks. For example, a characteristic of available devices is that their response slows down as the unit becomes cooler. It has been observed that available devices eventually become temporarily inoperable as the unit cools under repeated contact with the ice. An operator must then wait for the unit to warm up again before resuming a series of readings. Available portable ultrasonic devices also lack means for locally and automatically logging a series of recorded measurements, thereby requiring an operator to scribe the readings. Existing units also are not configured for ease of operation when applied to the measurement of ice sheet thickness. The operator must bend over or kneel to operate the controls of the unit and to view the readout.

Given the importance of timely and accurate ice thickness associated with present ice thickness measurement techniques, a portable, non-destructive thickness measuring device configured for the rapid measurement and automatic recording of ice thickness would be welcome.

SUMMARY OF THE DISCLOSURE

The systems disclosed herein offer a non-destructive, ultrasonic thickness measurement of an ice sheet that is disposed on a solid or granular substrate, such as found in indoor ice arenas and outdoor skating and skating sport venues. The systems provide rink operators the ability to increase the speed and accuracy of thickness measurements of ice sheets for the enhancement of ice sheet quality, providing attendant benefits of enhanced safety and reduced labor and energy costs.

The device offers a marked improvement in the speed and accuracy of the measurements over existing ice sheet measurement techniques. A properly tuned system may provide thickness measurements with an accuracy of ±2-mm (±1/16-in.). The device may be configured to automatically record the data for immediate or subsequent download to a computer for entry into a database and subsequent display and/or print out, as well as transmission to remote locations. The device may also be configured to operate in a live, non-data logging mode enabling an ice technician to test and take remedial measures on a concentrated, problematic area of the rink.

In one embodiment, a probe that houses a contact dual ultrasonic transmitter and receiver is combined with a handle and a portable console having a trigger, thumb operated joystick style pushbuttons and an LCD graphics display. The console contains circuitry including a microprocessor, memory device, analog driver for sending electrical signals to the transmitter, analog-to-digital converter for receiving signals from the receiver, operator switch interface and an external input-output data port. The unit may be powered by batteries and may include a plug in port for recharging.

The ice measurement system may include a transducer for transmitting ultrasonic or acoustical pulses at a frequency that propagates at a velocity appropriate for resolving the thickness of the ice. A representative and non-limiting range of thicknesses detectable by the disclosed system is from 12- to 100-mm (0.5- to 4.0-in.). The frequency of transmission may be fixed or operator selected.

The graphics display may include a graphics module with a back light option for displaying menu options. A character display may post the result of a measurement resolved to 0.1-mm or 0.01-in., and may also include a low battery indicator.

The unit may also be configured to display a map of a rink. The rink display may be configured to tell the operator which location to poll next. Alternatively, the operator may use the display to select the location he is about to record, for example by scrolling through the locations with a button operated scroll or a joystick, or by the use of a wand-actuated touch screen.

The ice measurement system may be programmable over a digital I/O port, enabling the operator to create and upload the pattern and location of sites to be polled and also to allow for the downloading of data. The data storage capabilities may also extend to the entry of supplemental data fields, such as operator identification, date, time, and general comments (e.g such as the description of remedial measures taken by the operator an ice technician). The ice measurement system may also be configured to store data from multiple ice sheets within large facilities.

In one embodiment, the operator determines the number and location of sites to be measured, and programs this information into the unit, either locally or with a computer interface. In operation, the graphic screen may be configured to display the rink, the test pattern and the character display. The LCD may flash a small block outline indicating a location on the ice sheet that the operator should measure. After the measurement is taken and displayed, it may be entered into memory or overridden with another measurement. Alternatively, the program may take or prompt the operator to take multiple measurements at a given location to enable statistical treatment of the data, or to take data points at several locations within a given sector. Once the requisite number of measurements are entered into memory for a given sector, the display may be configured so that the flashing block becomes solid and the next sector to be polled flashes. The procedure may be repeated until all the sectors on the display graphic are polled.

In an alternative embodiment, the operator tells the system the sector or location that a given measurement is being taken. This may be accomplished by scrolling through the locations with a button operated scroll or a joystick, or by the use of a touch screen. Because the size of the map is limited, the touch screen may be actuated with a wand rather than by human fingers. The number of data points entered from a given sector may be left to the discretion of the operator, based on observations made during the inspection process.

BRIEF DESCRIPTION OF THE DRAWINGS

FIGS. 5 and 5A are top views of the probe assembly of FIG. 3;

FIG. 7 is a partial sectional view of a transducer tip assembly of the probe assembly of FIG. 3;

FIG. 8 is an exploded view of the transducer tip assembly of FIG. 7;

FIG. 9 is a front elevation view of a probe assembly for an ice thickness measurement system in an embodiment of the invention;

FIG. 10 is a side elevational view of the probe assembly of FIG. 9;

FIG. 11 is a front elevation view of a probe assembly for an ice thickness measurement system in an embodiment of the invention;

FIG. 12 is a side elevational view of the probe assembly of FIG. 11;

FIG. 13 is a perspective view of the probe assembly of FIG. 11;

FIG. 14 is a partial side view of an alternative tip assembly for use with the probe assembly of FIG. 11;

DETAILED DESCRIPTION

Figure 1:
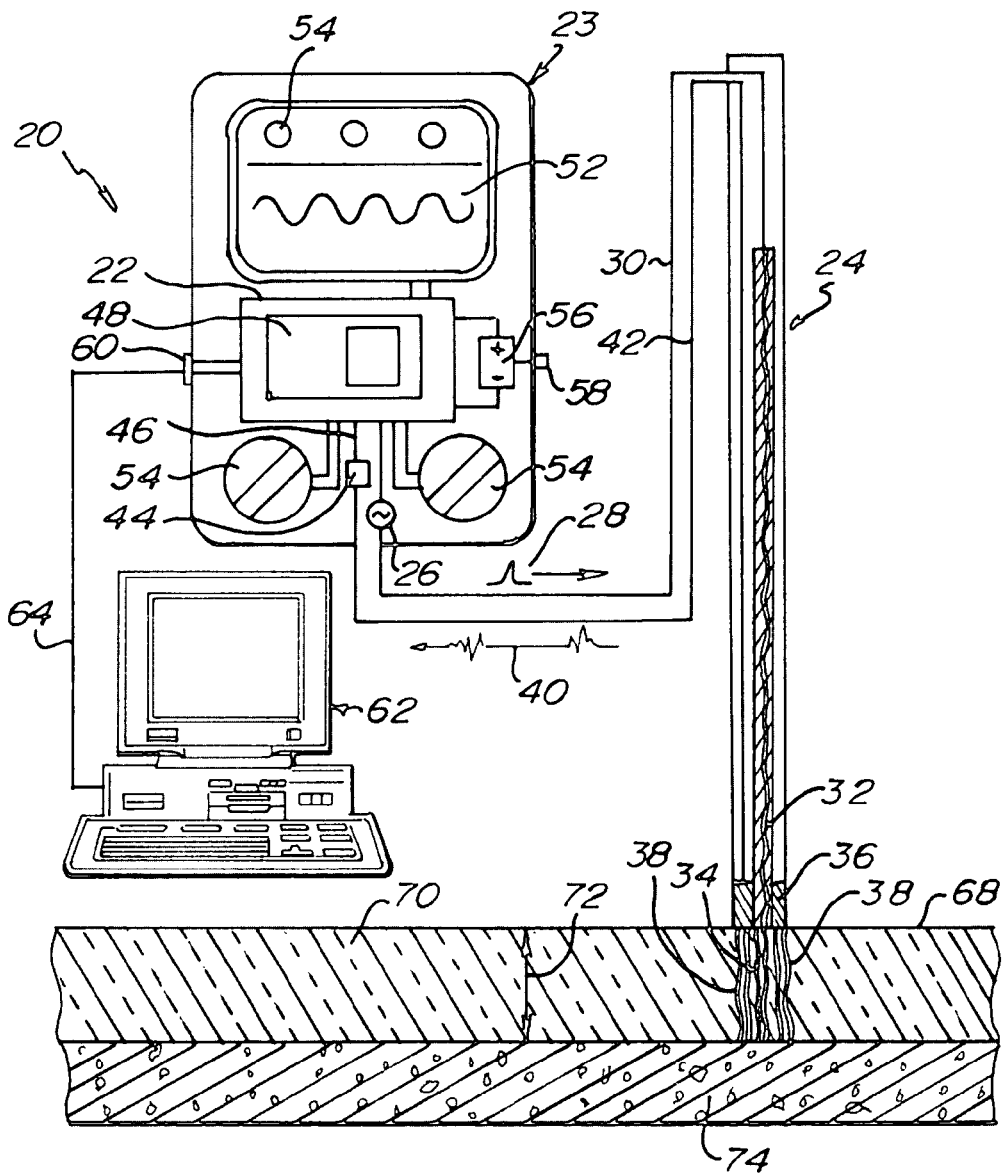
FIG. 1 is a block diagram of an ice thickness measurement system in an embodiment of the invention.
Figure 2:
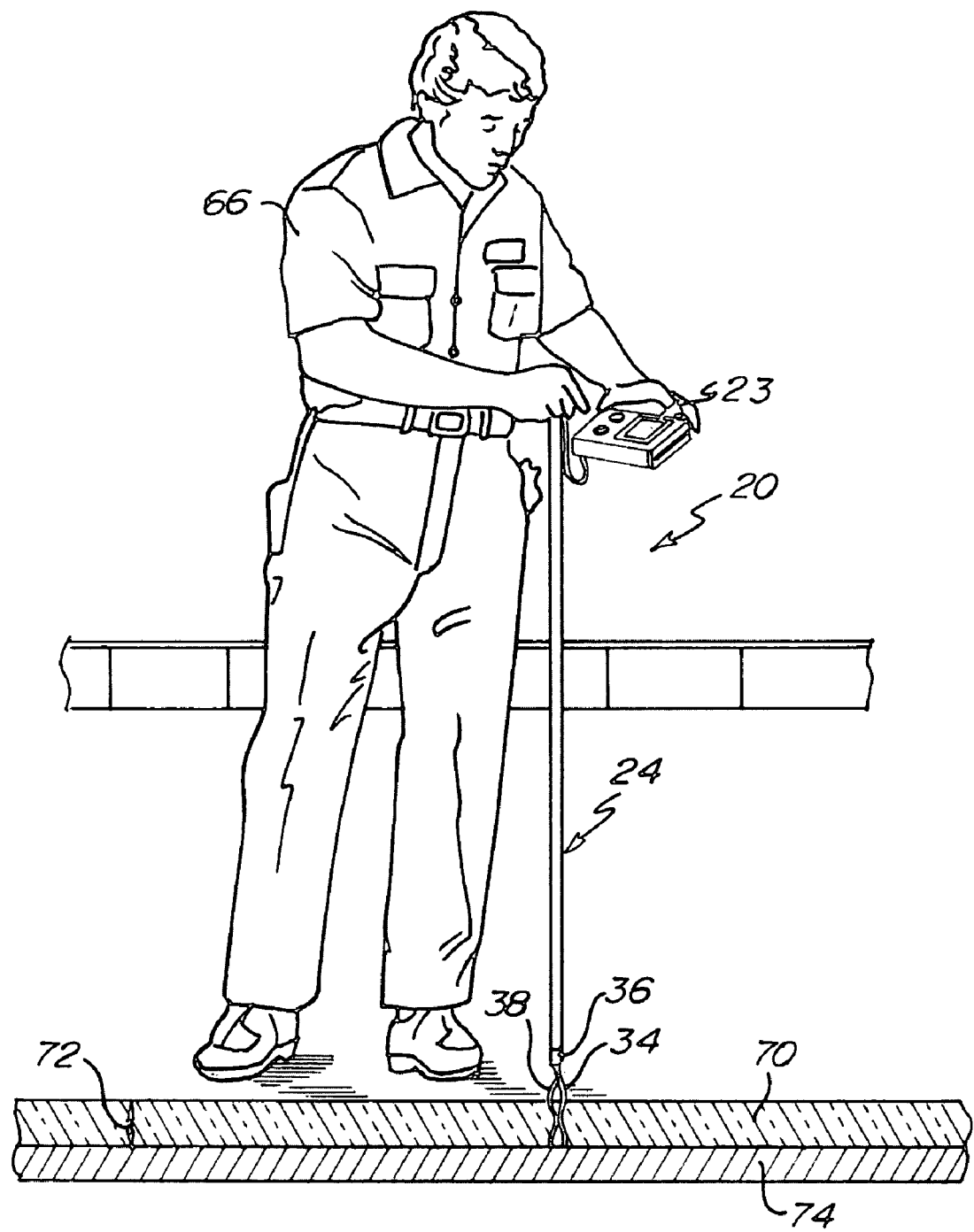
FIG. 2 depicts an operator utilizing the ice thickness measurement system of FIG. 1.
Figure 3:
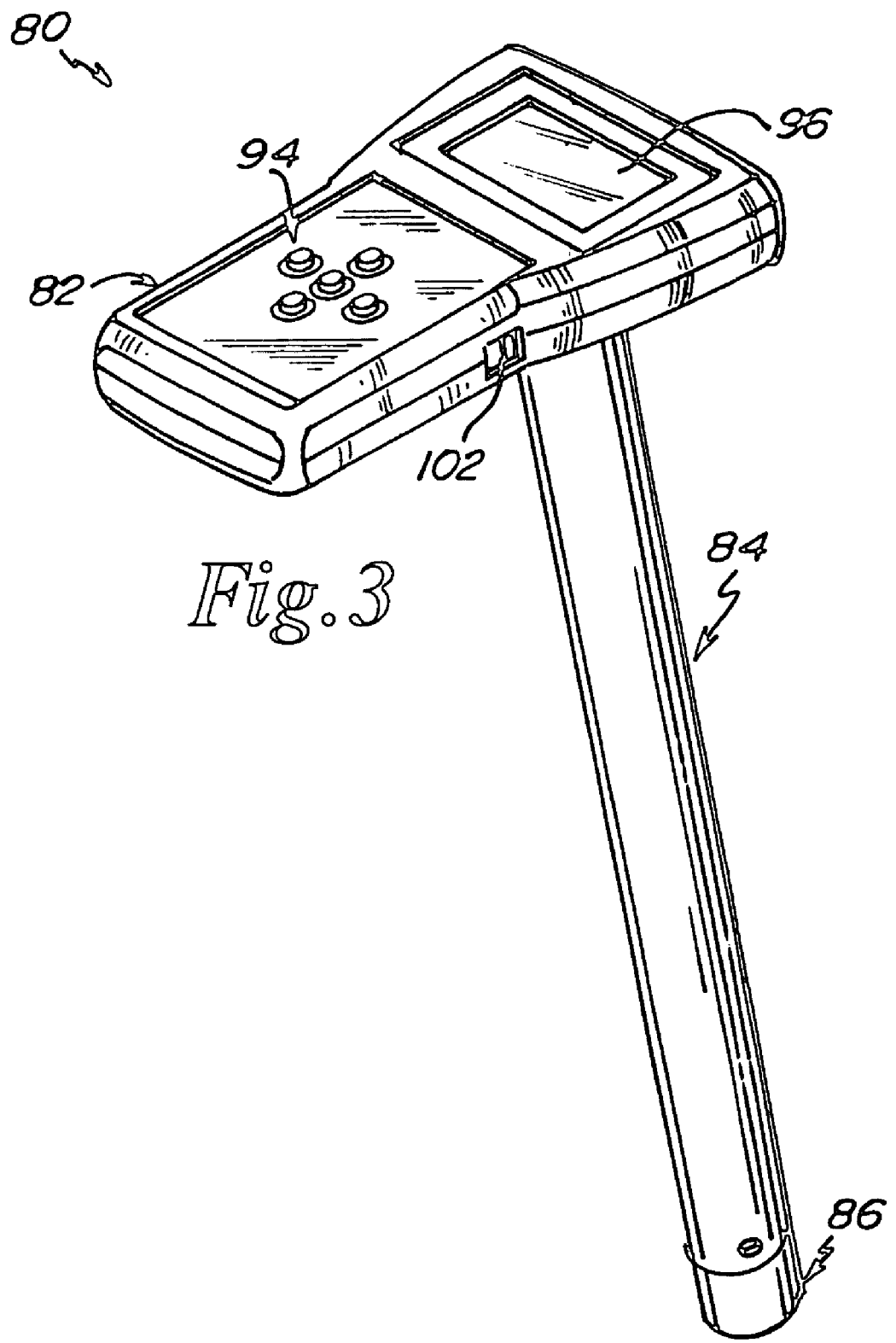
FIG. 3 is a perspective view of a probe assembly for an ice thickness measurement system in an embodiment of the invention.
Figure 4:
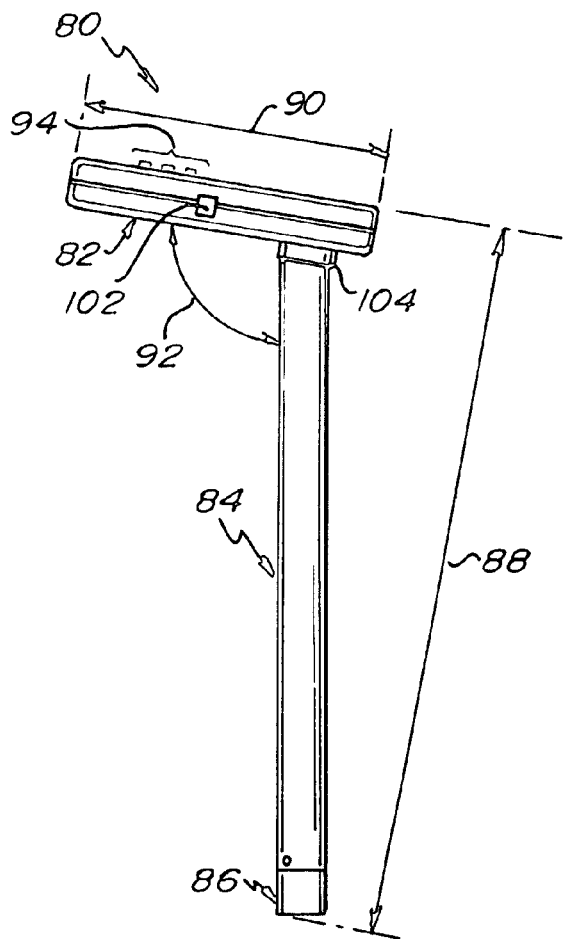
FIG. 4 is an elevational view of the probe assembly of FIG. 3.
Figure 5:
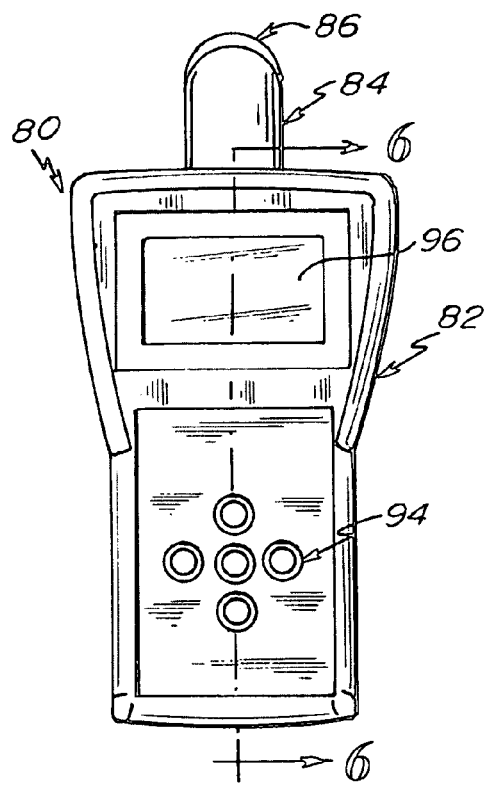
Figure 6:
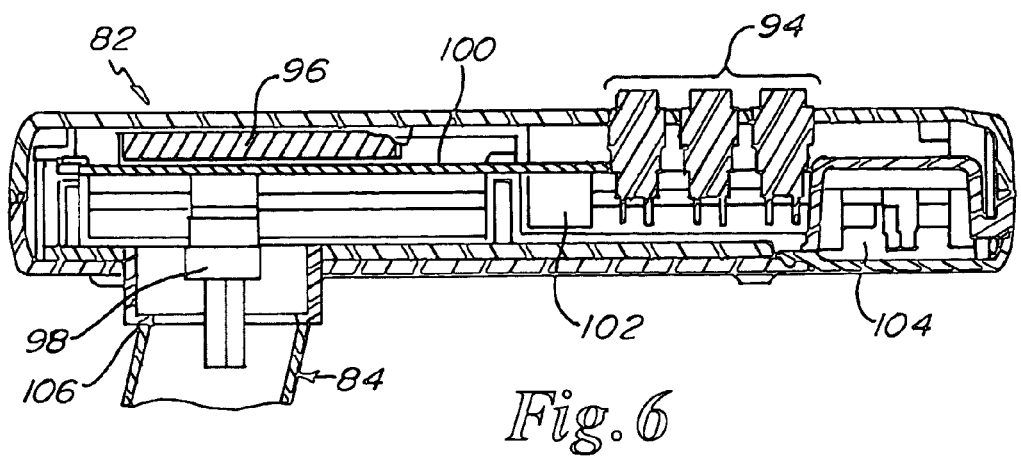
FIG. 6 is a sectional view of the probe assembly of FIG. 3 as indicated in FIG. 5.
Figure 15:
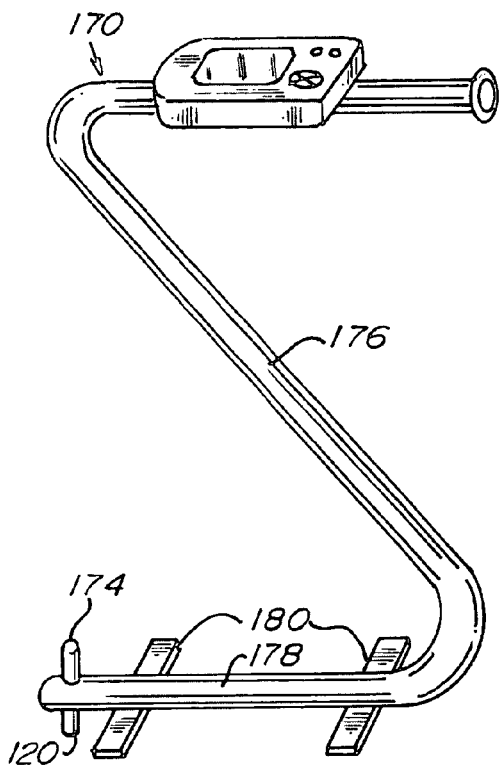
FIG. 15 is a perspective view of a probe assembly for an ice thickness measurement system in an embodiment of the invention.
Figure 16:
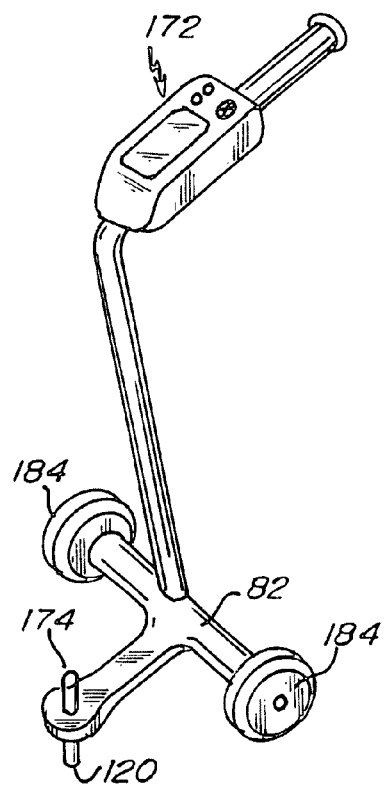
FIG. 16 is a perspective view of a probe assembly for an ice thickness measurement system in an embodiment of the invention.
Figure 17:
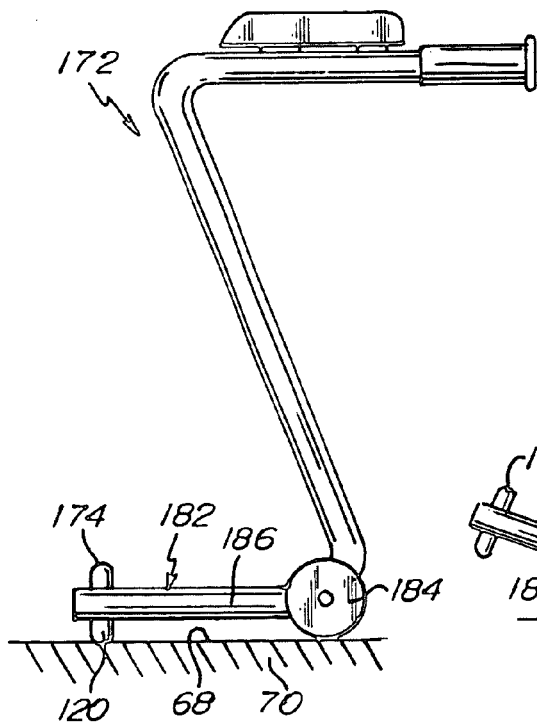
FIG. 17 is an elevational view of the probe assembly of FIG. 16.

Referring to FIGS. 1 and 2, an ice thickness measurement system 20 is depicted in an embodiment of the invention comprising a signal processor 22 contained within a hand held console 23 and operatively coupled with a probe 24. The system depicted in FIGS. 1 and 2 is a dual element system comprising a transmitter or transmitting element 32 and a receiver or receiving element 36. The signal processor 22 may include a transmit signal or transmit pulse generator 26 that outputs a transmit signal or pulse 28 along a transmit lead 30 to the transmitter 32. The transmitter 32 converts the transmit signal 28 to a transmitted acoustic signal 34 that is congruent with or otherwise controlled by the frequency and amplitude of the transmit signal 28.

In one embodiment, the receiver 36 is configured to receive at least a portion of a reflected acoustical signal 38. The receiver 36 can be configured to convert the acoustic energy of the acoustical signal 38 to a received signal 40 that is propagated along a receiver lead 42 to a digitizing device 44 such as an analog-to-digital (A/D) converter, a pulse detector, or an edge detector for echo time measurement. A digital signal 46 may be produced by the digitizing device 44 and may be routed to a microprocessor 48 for processing.

The signal processor 22 may further include or be operatively coupled with a writable memory device 50 suitable for writing or storing the digital signals 46 electronically, such as a random access memory (RAM). The memory device 50 may further include a read-only memory (ROM) containing instructions such as software or firmware for processing the data. Alternatively, the ROM may be located on a separate memory device (not depicted) that may be located within the hand held console 23 and accessible by the microprocessor 48. A copy of an example source code for some of the various computer executed instruction sets described in this application are provided on the compact disk that accompanies this application.

The microprocessor 48 may also control the signal generator 26 according to a programmed algorithm or set of instructions contained in the memory device 50. The instructions may also enable the microprocessor 48 to determine a time interval between the generation of the transmit pulse 28 and a characteristic of the received signal 40. For example, when the transmit pulse 28 is generated, the microprocessor 48 may reset or mark the time of a clock 51. The digitizing device 44 may comprise an edge detector that establishes when the rising edge of the received signal 40 is sensed by the receiver 36 relative to the reset or marked time of the internal clock 51. The microprocessor 48 may determine the time interval between the reset or marking event and the characteristic event of the received signal 40. The clock 51 may be internal to the microprocessor 48 (as depicted) or comprise a timing device external to but accessed by the microprocessor 48.

The hand held console 23 may optionally include a display device 52 operatively coupled to the signal processor 22. The display device 52 may be a LED array or liquid crystal display panel. The hand held console 23 may further include operator controls 54 such as switches, push buttons, continuously variable adjustment devices and/or other operator interface devices available to the artisan.

The hand-held console 23 may be powered by a battery or batteries 56. The batteries 56 may be replaceable or rechargeable. A recharging port 58 may be accessible from the exterior of the hand held console 23 for servicing the battery or batteries 56 that are rechargeable.

A data port 60, such as a standard serial I/O port or USB port, may be included on the hand held console 23 and operably connected with the signal processor 22 for sending and/or receiving digital signals from a computer 62. Data that is downloaded to the computer 62 may be stored, manipulated (e.g. printed out on a hard copy, displayed on a monitor 63) and/or transmitted to remote locations. The data port 60 may be connected over a digital data cable 64 or by a wireless connection (not depicted). In an alternative embodiment, the signal processor routes the digital signal 46 directly to the computer 62 for processing, storage and display, or some combination thereof. The computer 62 may also be used to enter or modify the software or firmware over the digital data cable 64 or wireless connection, or to actively control the signal processor 22.

In operation, an operator 66 places the probe 24 in contact with an exposed face 68 of an ice sheet 70 characterized by a local thickness 72, the ice sheet 70 being formed on or otherwise positioned on a substrate 72. The substrate may be of a solid surface such as metal or concrete, or of a granular surface such as sand or compacted earth, or of any other substance that provides reflected acoustical signal 38 of adequate strength to be resolved by the receiver 36. The operator 66 manipulates the controls 54 to cause or trigger the transmitted acoustical signal 34 to be propagated through the local thickness 72 of the ice sheet 70. A portion of the reflected acoustical signal 38 may be reflected back to receiver 36 and converted to the received signal 40 for routing to the signal processor for digitization by the digitizing device 44.

The digitized signal 46 may be processed by the microprocessor 48 to establish a value of the local thickness 72 that is stored to the memory device 50. In an alternative embodiment, the received signal 40 may be routed to the remote computer 62 for digitization and processing.

Referring to FIGS. 3 through 8, an embodiment of a probe assembly 80 of an ice thickness measurement system according to the invention is depicted. The probe assembly 80 includes a console 82, a probe body 84 and a transducer tip assembly 86 disposed at the end of the probe body 84. The probe assembly 80 is characterized by an overall height 88, and the console by an overall length 90. The relationship between the console 82 and probe body 84 is further characterized by an angle 92 that may be obtuse.

The console 82 includes user controls 94 such as push buttons for operation of the probe assembly 80, and a display panel 96. The depicted embodiment includes navigation buttons 95 for navigating through the various panel displays and menus, and an execution button 97. The console also may house a transducer connector 98, an integrated circuit board 100, a digital I/O port 102 and a battery compartment 104.

The console 82 may be fabricated from an impact resistant plastic or other suitably durable material, and may be manufactured using an injection molding process or other process available to the artisan. The probe body 84 may be fabricated from a variety of tubular materials, such as metal, plastic, PVC or other materials available to the artisan.

The console 82 and probe body 84 are joined by a connection 106. The connection may be permanent, such as by gluing or other fusion bonding, or selectively separable. Separability of the connection 106 may be provided by a threaded joint, an interference fit or by a snap fit.

Functionally, the angle 92 may provide an angle of inclination between an operator and the display 96 for easier viewing of the display 96. A connection 106 that is separable enables the probe assembly 80 to be broken down for more compact storage. The connection may also include a hinge member (not depicted) that would enable the probe body 84 to be folded against the console 82 for compact storage.

The transducer tip assembly 86 of the depicted embodiment of the probe assembly 80 includes a bi-directional transducer 110 retained within a housing 112 that is removably mounted to a distal end 114 of the probe body 86 (FIGS. 7 and 8). In this embodiment, the housing 112 is held in place with a plurality of screws 116. Alternatively, the transducer housing 112 may be operably coupled to the distal end 114 of the probe body 86 by other means, such as a threaded connection, a snap connection, a clip or a slidable interference fit (not depicted). A biasing spring 118 operates against the bi-directional transducer 110 to make the sensing face 120 of the bi-directional transducer 110 project proud relative to a distal end 122 of the transducer housing 112. A clip ring 126 may be operably coupled to a proximal end 128 of the transducer housing for the biasing spring 118 to seat against.

The bi-directional transducer 110 is capable of both transmitting and receiving acoustical or ultrasonic signals, thereby providing a more compact design than the configuration of FIG. 1. The configuration of the transducer tip assembly 86 enables replacement of the bi-directional transducer. The housing 112 may be formed from a variety of materials, including metal or a polymer based material. Fabricating the housing 112 from a polymer such as plastic or PVC thermally insulates the transducer 110 from the ice, which may provide more stable operation of the ice measurement system. Other embodiments may comprise a metal outer housing with an insulation material between the outer housing and the sensor to affect the thermal isolation.

In operation, the biasing spring 118 provides shock absorption and strain relief that prevents the bi-directional sensor 110 from being overstressed and damaged when the operator places the transducer in contact with the ice sheet 70 and bears down on the probe assembly 80. The biasing spring 118 allows the sensing face 120 of the bi-directional transducer to retract into the housing upon heavy loading, and also provides a substantially constant force for the registration of the sensing face 120 of the bi-directional sensor 110 against the exposed face 68 of the ice sheet 70.

Though not depicted, it is noted that a temperature measurement is readily incorporated with the probe assemblies. A thermocouple or other suitable temperature sensor could be routed to the distal end 122 of the transducer housing 112 and made to contact the exposed face 68 of the ice sheet 70. The end portion of the temperature sensor could be coiled on the contacting face of the distal end 122 to reduce or eliminate thermal gradients near the junction of the temperature sensor. The leads of the temperature sensor could be routed through or along the probe body 84 and into the console 82, which could house a appropriate electronics for converting the signal from the temperature sensor to a temperature. The data could be stored along with the thickness measurements.

Referring to FIGS. 9 and 10, another embodiment of a probe assembly 140 is illustrated, the assembly again including a console 142, a probe body 144 and a transducer tip assembly 146. The console 142 includes operator controls 150 and a display 151. In this arrangement, the console 142 is also coupled to the probe body 144 with a pivot 148. A grip 152 may be provided on the probe body 144. The transducer tip assembly 146 may include the same construction and assembly features as the transducer tip assembly 86 of the probe assembly 80. However, in addition, the probe assembly 140 includes a heating element 154 that is operably coupled to the transducer tip assembly 146.

Functionally, the pivot 148 enables rotation of the console 142 to an angle that is convenient for operation of the user controls 150 and viewing of the display 151. The grip is provided for convenient handling of the probe assembly 140 during operation. Accordingly, the probe assembly 140 may by substantially longer than the other embodiments, placing the console above the waist for easy access to the grip 152.

The heating element 154 may serve a dual purpose. First, the heating element 154 may be controlled to a fixed or user selectable temperature, thereby maintaining the bi-directional transducer 110 at a more constant temperature for more stable operation. Second, the heating element 154 may be configured and controlled to provide a thin melt layer between the exposed face 68 of the ice sheet 70 and the sensing face 120 of the bi-directional transducer 110. The thin melt layer may produce a more repeatable interface between the ice sheet 70 and the bi-directional transducer 110, thereby enhancing the accuracy of the ice thickness measurement. Such temperature control function may be housed within the console 142 and augmented by a feedback temperature sensor such as a thermocouple (not depicted).

Referring to FIGS. 11 through 13, another embodiment of a probe assembly 160 is depicted wherein a handle 162 is positioned atop the probe assembly 160. Otherwise, the probe assembly 160 may have the same components as the probe assembly 140 (i.e. the console 142, the probe body 144 and the transducer tip assembly 146). In addition, the transducer tip assembly 146 may be canted for normal registration of the sensing face 120 when the probe body 144 is held at an angle θ relative to normal.

In operation, the probe assembly 160 is tilted slightly so the operator may hold the probe assembly in one hand with his or her arm extended and operate the console with the other hand.

Referring to FIG. 14, an alternative configuration of the probe assembly 160 is depicted wherein a transducer 162 is mounted on a bracket 164 that is coupled to probe body 144 with a pivot or hinge 168. The pivot or hinge 168 may be biased, for example, with a spring.

Functionally, the pivot 168 enables the tip assembly 146 to register normal to the exposed face 68 of the ice sheet 70 across a range of angles α. When biased, the pivot or hinge 168 serves to protect the transducer 162 from excessive mechanical load while providing a suitable registration force of the transducer 162 on the exposed face 68 of the ice sheet 70.

Referring to FIGS. 15 through 18, embodiments of probe assemblies 170 and 172, respectively, are portrayed that address the aspect of maintaining a normal registration of a transducer 174. The probe assembly 170 includes a probe body 176 having a distal end portion 178 equipped with feet 180 that are spaced apart to rest stably on the ice sheet 70. The feet 180 also are oriented so that the sensing face 120 of the transducer 174 registers flat against the exposed face 68 of the ice sheet 70 and with an appropriate level of force.

The probe assembly 172 (FIGS. 16 through 18) includes a frame 182 having a pair of wheels 184 and an extending arm 186. The sensing face 120 of the transducer 174 combine with the two wheels 184 to provide three points of contact on the exposed face 68 of the ice sheet 70, with the sensing face 120 of the transducer being normal to the ice sheet 70.

Figure 18:
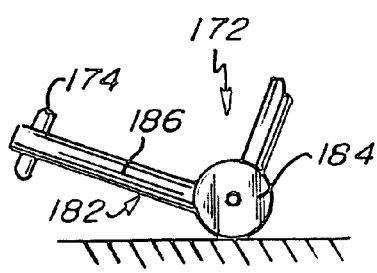
FIG. 18 is a partial elevational view of the probe assembly of FIG. 16.

In operation, the probe assembly 172 is wheeled with the extending arm 186 rotated upward to the location on the ice sheet 70 where a thickness measurement is desired (FIG. 18). The probe assembly 172 is then made stationary with the sensing face 120 of the transducer 174 in contact with the exposed face 68. The probe assembly 172 is configured and weighted to exert an appropriate and repeatable static force on the sensing face 120 of the transducer 174. The combination of repeatable force and normal registration of the transducer 174 thereby enhances the repeatability of the ice thickness measurement.

Figure 19:
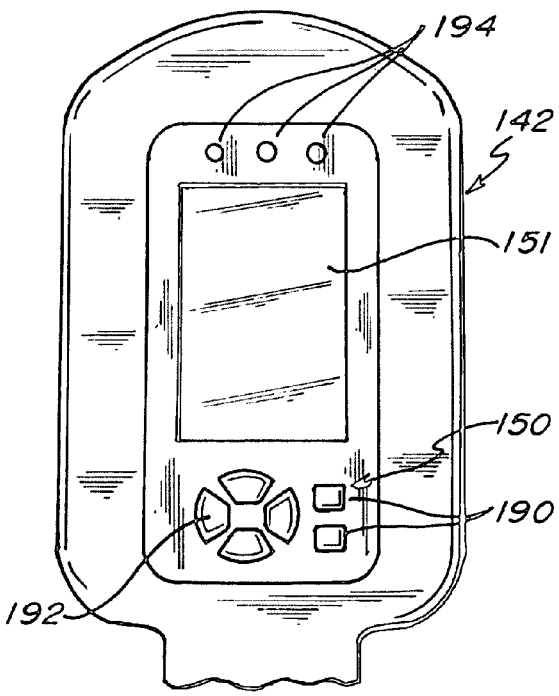
FIG. 19 is a front view of a console utilized in various embodiments of the invention.

Referring to FIG. 19, the console 142 of certain embodiments depicted above (i.e. probe assemblies 140, 160, 170 and 172) is illustrated. The user controls 150 include toggle buttons 190 for Boolean operations such as power on/power off and triggering the probe assembly to take a data point. The user controls 150 also include directional buttons 192 for operations such as scrolling through menu selections and manipulating the display 151. The console 142 also includes various indicators 194 to alert the operator of the status of various items such as battery low indication, taking data, data stored, etc. The various status indications may be accomplished by on/off illumination of lights or LEDs, or by illumination of different colors.

In one embodiment, the so-called "pulse-echo" technique is utilized to infer the thickness 72 of the ice sheet 70. The "pulse-echo" technique is described generally in an ice measurement application in U.S. Pat. No. 4,628,736 to Kirby et al., which is hereby incorporated by reference other than any express definitions of terms specifically defined therein. With the pulse echo technique, the transmit pulse 28 having a characteristic or operating frequency is introduced at the exposed face 68 of the ice sheet 70. The signal processor 22 determines the time required for the "echo" or reflected acoustical signal 38 to be received by the receiver 36 or bidirectional transducer 110. The local thickness 72 of the ice sheet 70 is then determined by the equation $$T = \tfrac{1}{2} \cdot C_i \cdot \Delta t_i \qquad \text{Eqn. (1)}$$

where T is the thickness 72 of the ice sheet 70, Ci is the acoustical propagation velocity of sound or acoustical propagation velocity in ice, and $\Delta t_i$ is the time of flight through the ice sheet 70 as measured between transmittal and reception of the acoustical pulse.

The acoustical propagation velocity Ci in ice is known to vary substantially, depending on the composition of the ice. For example, the velocity of sound in ice formed of pure water is approximately 1400 m/s, whereas the velocity of sound in ice formed of seawater is on the order of 1450 m/s, depending on the salinity. Error in the assumed velocity Ci propagates to errors in the determination of the thickness T. The greater resolved thickness T, the greater the propagation of the error attributed to uncertainty in the acoustical propagation velocity Ci.

Kirby et al. utilized Eqn. 1 was to establish the thickness T of ice on surfaces of vehicles such as aircraft wings, having a thickness on the order of a few millimeters. For the present application, resolution of thicknesses range typically from 25- to 40-mm, with an accuracy in the range ±2-mm desired.

Furthermore, in some embodiments of the present invention, the measured time delay includes propagation time through the transducer 110. That is:

$$\Delta t = \Delta t t + T/C_i \qquad \text{Eqn. (2)}$$

$$=> T = (\Delta t - \Delta t t) \cdot C_i \qquad \text{Eqn. (3)}$$

$$=> T = C_i \cdot \Delta t - \Delta t t \cdot C_i \qquad \text{Eqn. (4)}$$

where $\Delta t$ is the total time delay and $\Delta t t$ is the propagation time through the transducer and attendant cabling. It is noted that the acoustical propagation velocity Ci and the propagation time through the transducer $\Delta t t$ may be dependent on the operating frequency.

At a given characteristic or operating frequency, $\Delta t t$ is generally a constant. The acoustical propagation velocity Ci may also be substantially constant for a given ice composition. Accordingly, Eqn. (4) may be a substantially linear equation taking the form of $$T = m \cdot \Delta t + b \qquad \text{Eqn. (5)}$$

where m and b are Ci and $\Delta t t \cdot C_i$, respectively, and are substantially constant. Assuming a linear relationship, the ice thickness measurement system 20 may be calibrated with as few as two data points.

Accordingly, the invention may include a set of instructions for a calibration protocol that enables field calibration of the unit. In one embodiment, the operator may be instructed to generate the response of the ice thickness measurement system 20 to ice of known thickness. The calibration protocol may require as few as two data points of T vs. Δt unique thicknesses T and used to solve m and b of Eqn. (5) directly. Alternatively, the calibration protocol may include acquiring data from three or more thicknesses T of ice and solving for m and b of Eqn. 5 using linear regression. The calibration protocol may utilize raw digital signals 46, or may utilize results from the factory calibration and apply a correction equation to the fit data, i.e.

$$T' = m' \cdot T + b' \quad \text{Eqn. (6)}$$

$$\Rightarrow T' = m' \cdot (m \cdot \Delta t + b) + b' \quad \text{Eqn. (7)}$$

$$\Rightarrow T' = m' \cdot m \cdot \Delta t + (m' \cdot b + b') \quad \text{Eqn. (8)}$$

$$\Rightarrow T' = M \cdot \Delta t + B \quad \text{Eqn. (9)}$$

where T' is the corrected thickness, m' and b' are the slope and offset coefficients, respectively, for the function of T' vs. T, and M and B are updated calibration coefficients that convert raw digital signals 46 to thickness values.

The calibration protocol may be provided in the form of executable instructions carried out by the microprocessor that prompts the user in a step-by-step manner to obtain and process the data, or they may be carried out separately by the operator, with the operator entering the final coefficients (i.e. m and b or m' and b') into the signal processor, or some combination thereof (e.g. the operator provides m' and b' and the microprocessor converts the data pursuant Eqns. (7) through (9)).

The equations above may be executed by the microprocessor 48 to process the digital signals 46 and the results stored in the memory device 50 for subsequent download to the computer 62 or other digital depository. Other data, such as but not limited to date, time, locale and/or position relative to a datum may also be recorded by the microprocessor 48 to the memory device 50.

Another factor in the proper tailoring of the ice measurement system 20 is the so-called "focal zone," defined as the region where the reflected on-axis pulse-echo signal is within −6 dB of a transmitted focal point amplitude. The focal zone provides an indication of the thickness domain over which an acoustical or ultrasonic system is operative. The domain of the focal zone is a function of several parameters, including the sonic velocity with in the medium under test and the frequency of the waveform or pulse introduced into the medium. A detailed description is of focal the focal zone and the parameters that affect it is presented in Appendix A.

Functionally, there is a range of frequencies that will provide an operative focal zone for the purpose of measuring an ice medium across the thickness range of interest (e.g. between 5-mm and 100-mm). An exemplary and non-limiting range is 1 to 10 megahertz (MHz). The specific frequencies and cycles implemented in a given situation may be tailored according to the acoustical characteristics of the ice sheet 70 and the reflective properties of the substrate 74.

In one embodiment, a 5-MHz pulse is propagated using a piezoelectric transducer configured for bidirectional operation. The bi-directional transducer may be of standard off-the-shelf construction, such as the Panametrics D790. Operationally, an initiation pulse of approximately 80 volts is introduced to the bidirectional transducer 110 in the transmission mode in this embodiment. The bidirectional transducer 110 is then switched into receiving mode after a delay of several microseconds. The delay enables the bidirectional transducer 110 to settle and for initial reflections between the sensing face 120 and the exposed face 68 to dissipate. The gain of the receiving system may be optimized via instruction from the microprocessor or by hardware adjustment.

Figure 20:
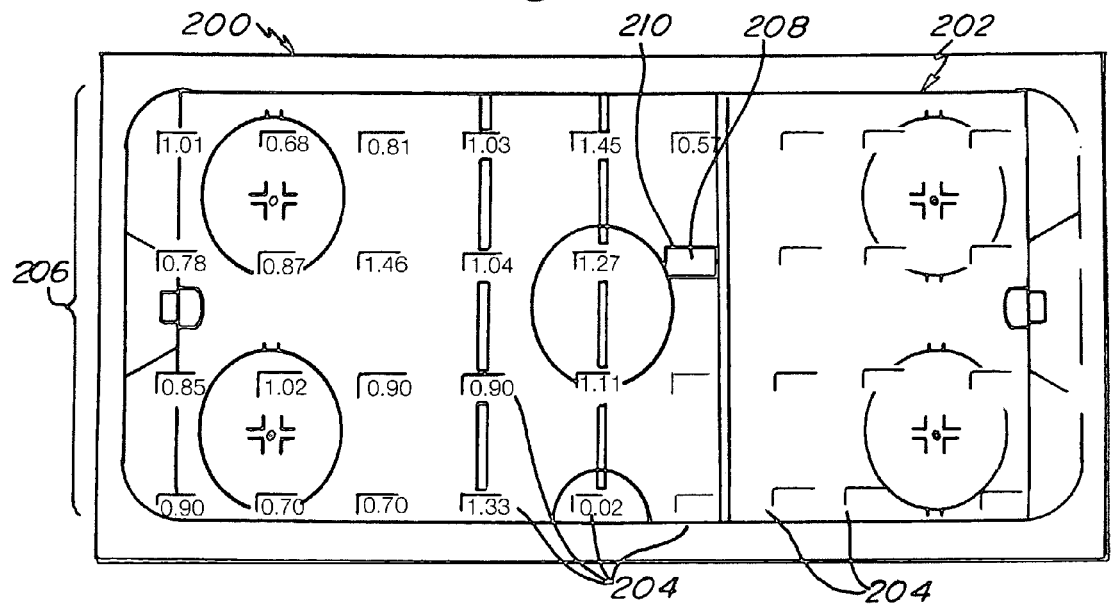
FIGS. 20 and 20A depict display graphics for use with probe assemblies in various embodiments of the invention.

Referring to FIG. 20, an example display graphic 200 that may appear on one of the displays 52, 96 or 151 of the various embodiments is depicted. The depicted display graphic 200 includes a schematic of an ice sheet 202 (in this case a hockey rink) with a plurality of data display boxes 204 arranged in a uniform array 206. The data display boxes 204 represent locations on the rink where thickness measurements are to be made. In the example of FIG. 20, the operator has made just over half of the thickness measurements of the array. The completed measurements are identifiable because there are numbers appearing in the respective display boxes. A target box 208 is outlined with a bold border 210 that tells the operator the approximate location of the next measurement to be taken. After data is taken at the bolded location, a number representing the thickness measurement will appear in the respective target box 208, and the bold border 210 will move to a different target box where the next measurement is to be taken. This procedure is repeated until all the locations represented by the boxes in the uniform array 206 have been polled. The operator steps through the sequence as directed by the movement of the bold border 208 on the display graphic 200.

Figure 20A:
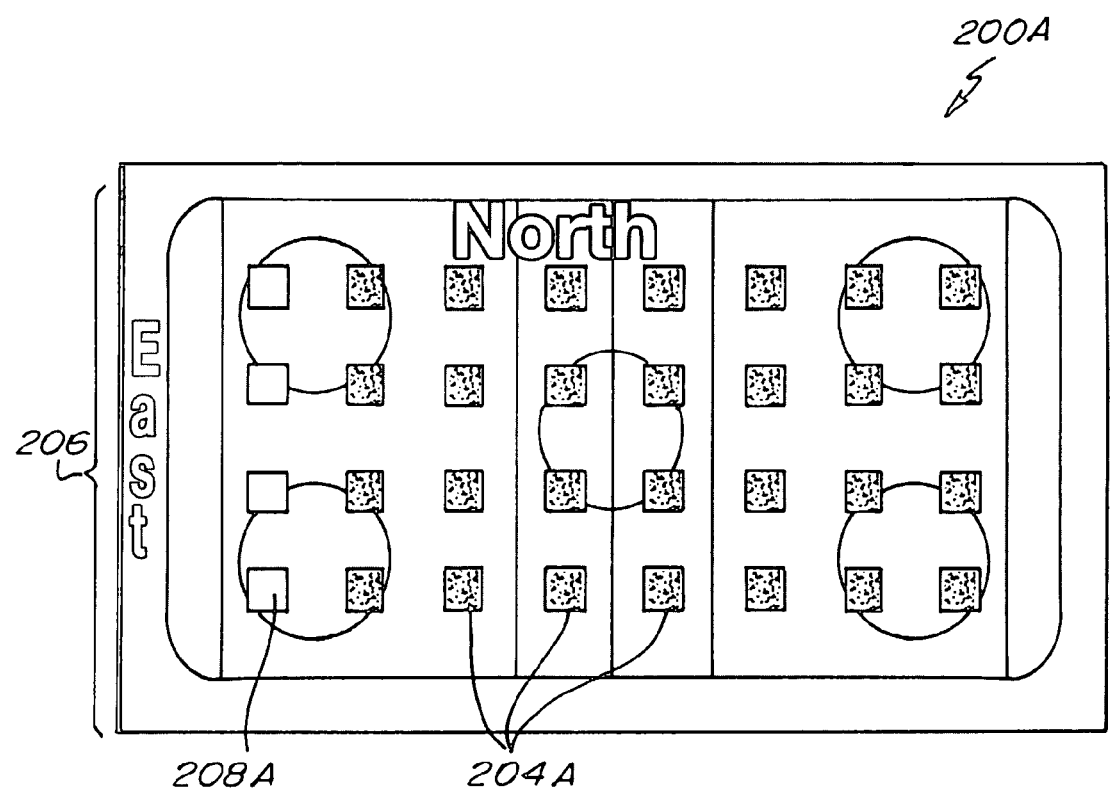

Referring to FIG. 20A, an alternative display graphic 200A is depicted. Here, the display graphic includes an array of squares 204A that fill in as one progresses through the data acquisition sequence. At the beginning of the polling sequence, all of the squares 204A may be open, such as depicted on the left end or "east" end of the array 206 in FIG. 20A. Once data is acquired at the location, the representative square 204A may be darkened in. A target box 208A is indicated on the display by flashing on and off. In this embodiment, numbers are not presented on the display graphic 200A, thus enabling a lower resolution display to be utilized.

Figure 21:
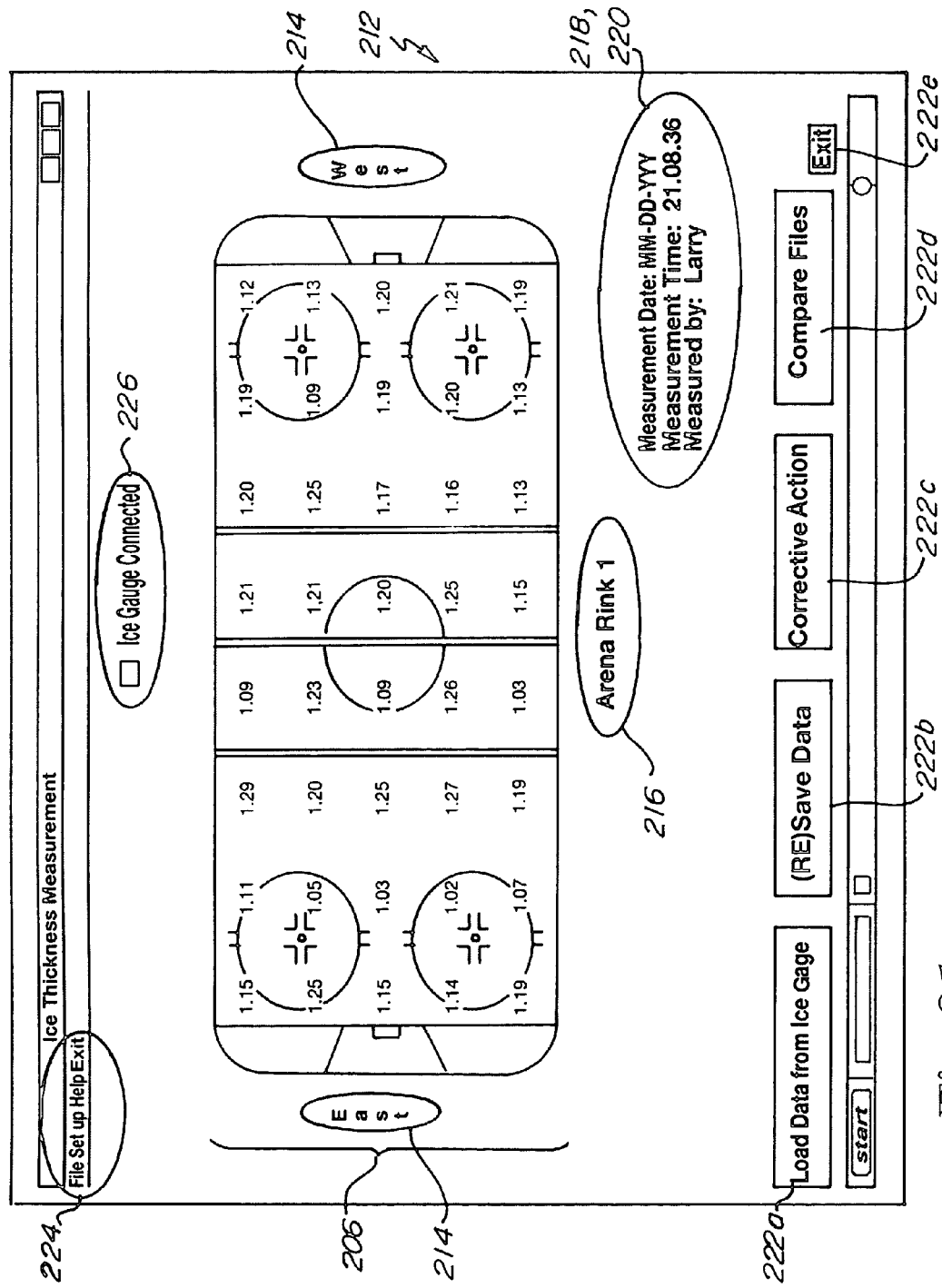
FIG. 21 depicts a main display for a computer monitor for displaying and manipulating data acquired by the various ice thickness measurement systems in an embodiment of the invention.

Referring to FIG. 21, a depiction of a main computer display interface 212 having a user interface and graphical presentation is presented in an embodiment of the invention. The main computer display interface 212 may include identification indicia 214 correlating with the ends of the ice sheet 70 under inspection. The uniform array 206 may be generally the same as presented on the display graphic 200. Several fields can be presented on the interface 212, including identification of the sheet 216, time and date markings 218, and identification of the operator 220. In this embodiment, the main computer display interface 212 includes function selectors 222a through 222e for direct actuation with a mouse-operated cursor, or by operator contact on a touch screen computer. Additional comment fields (not depicted) that include other entries such as comments from the operator may also be included on the display and/or on subsequent print outs that may be generated by the software. The main computer display interface 212 may also include a tool bar 224 for accessing menus and an indicator icon 226 that notifies the operator when the probe assembly 80 is in operative communication with the computer 62.

Figure 22A:
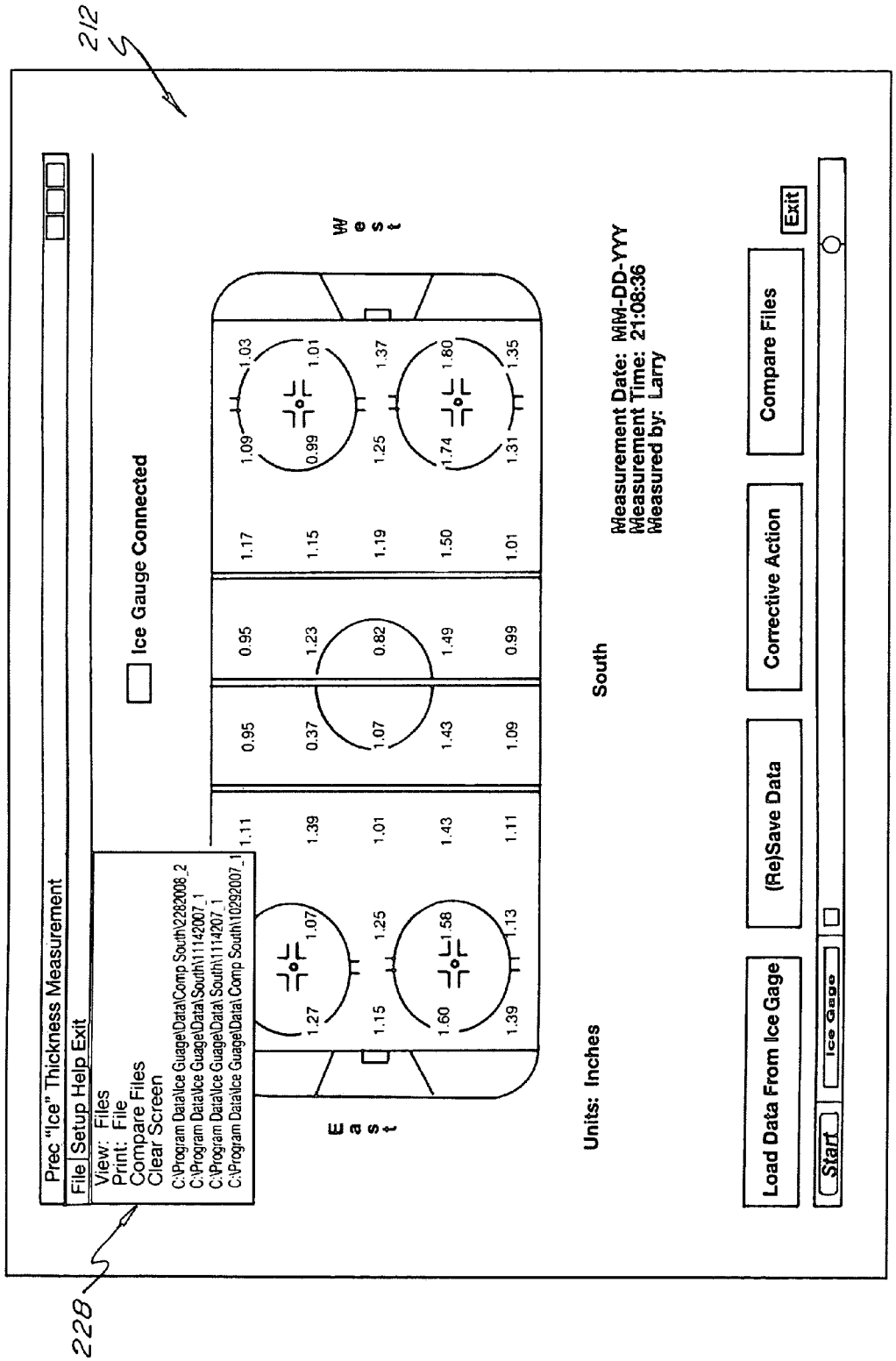
FIGS. 22A through 22I depict various displays accessible from the main display of FIG. 21.
Figure 22B:
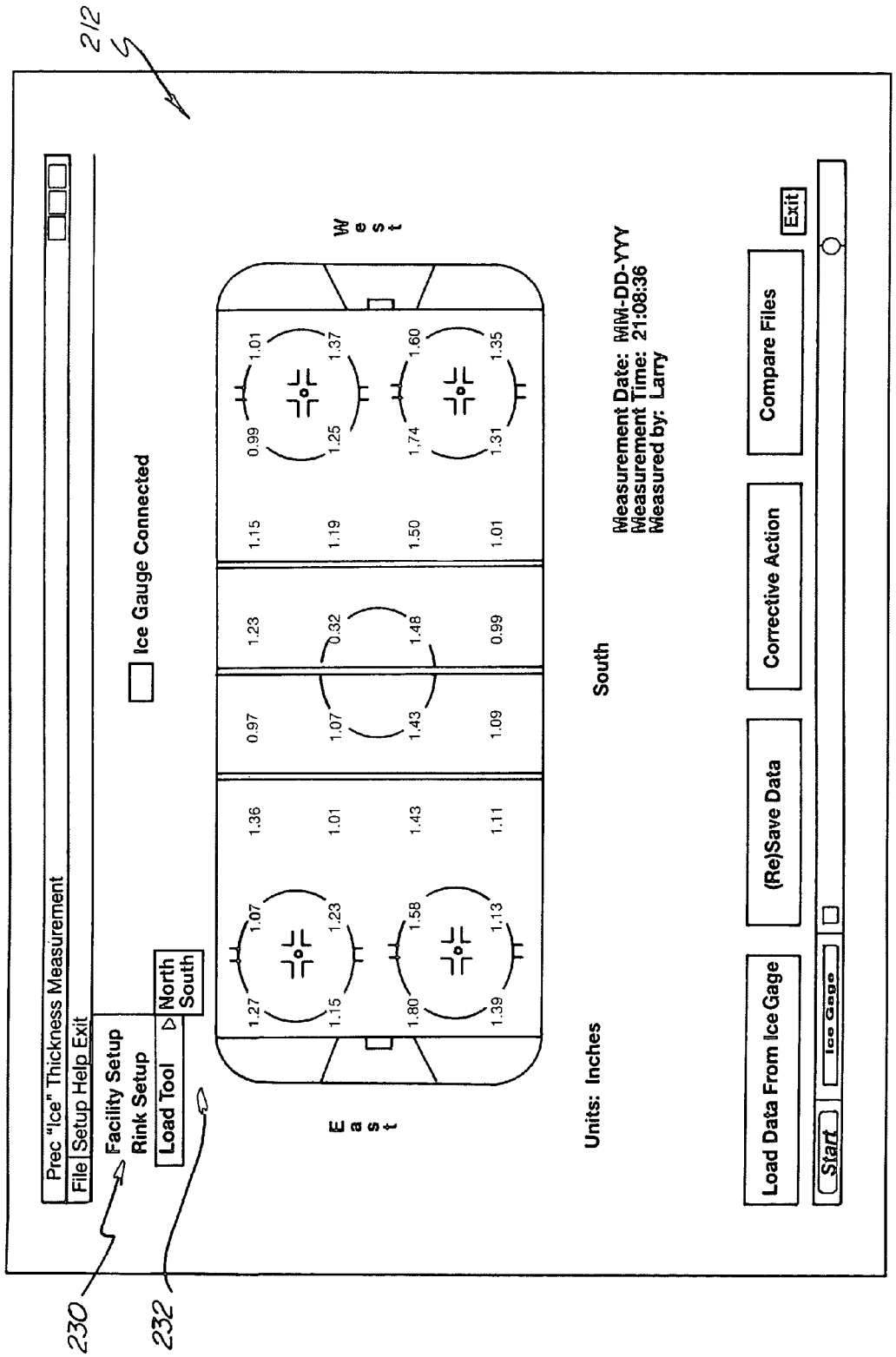

Referring to FIGS. 22A and 22B, some of the display menus accessible from the toolbar 224 are depicted in an embodiment of the invention. The "File" menu 228 (FIG. 22A) may include functions to view, print and compare files and clear the display interface 212, as well as direct access to more recently stored files. The "Setup" menu 230 (FIG. 22B) may include access for characterizing the facility or arena complex as well as a plurality of individual rinks within the facility. In the embodiment depicted, the setup menu 230 also includes a "Load Tool" sub-menu 232 for transferring rink information to the probe assembly 80. For example, a facility may include a "North" rink and a "South" rink. The sub-menu may enable ready loading of the respective rinks into the probe assembly 80.

Figure 22C:
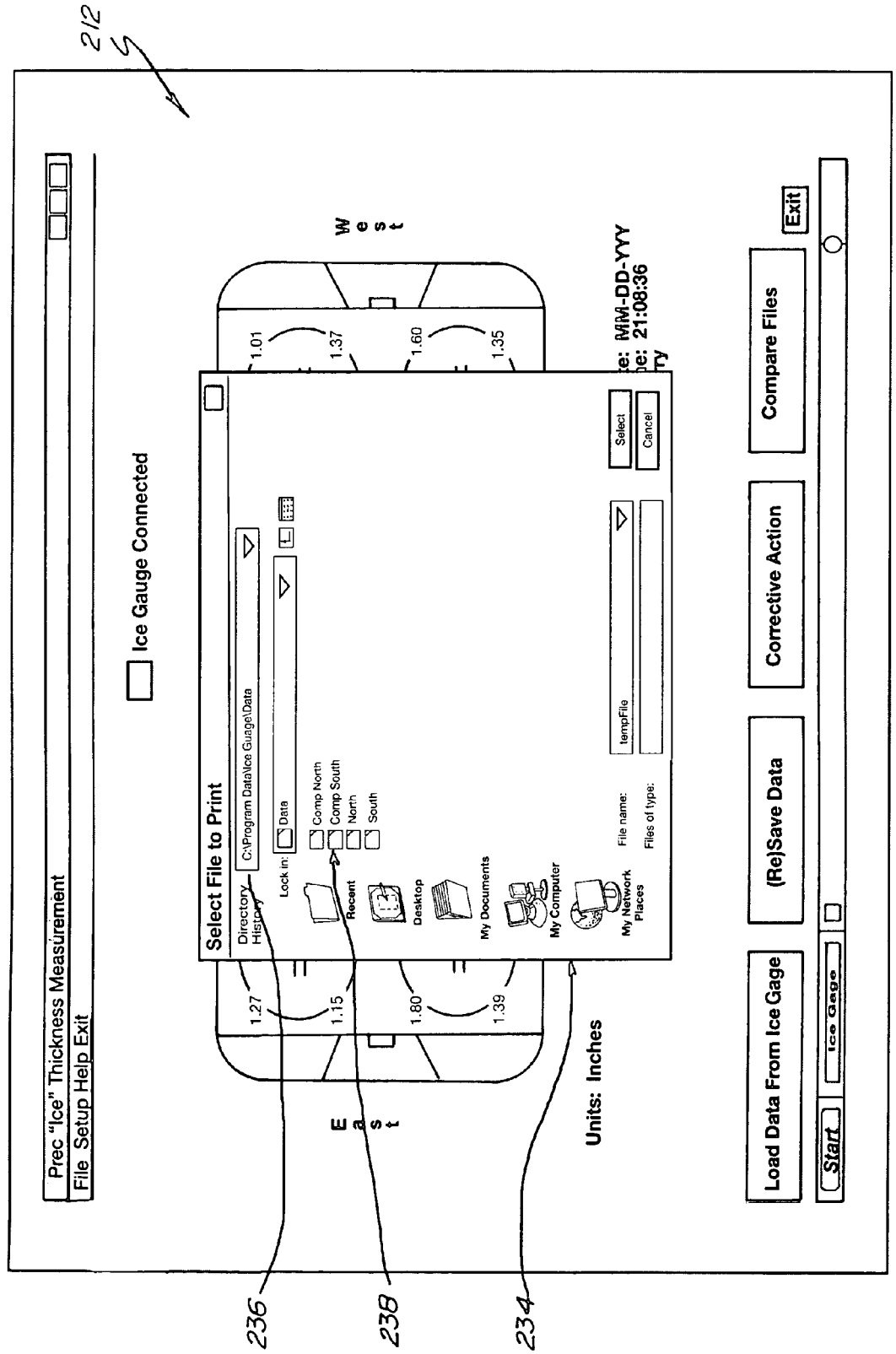
Figure 22D:
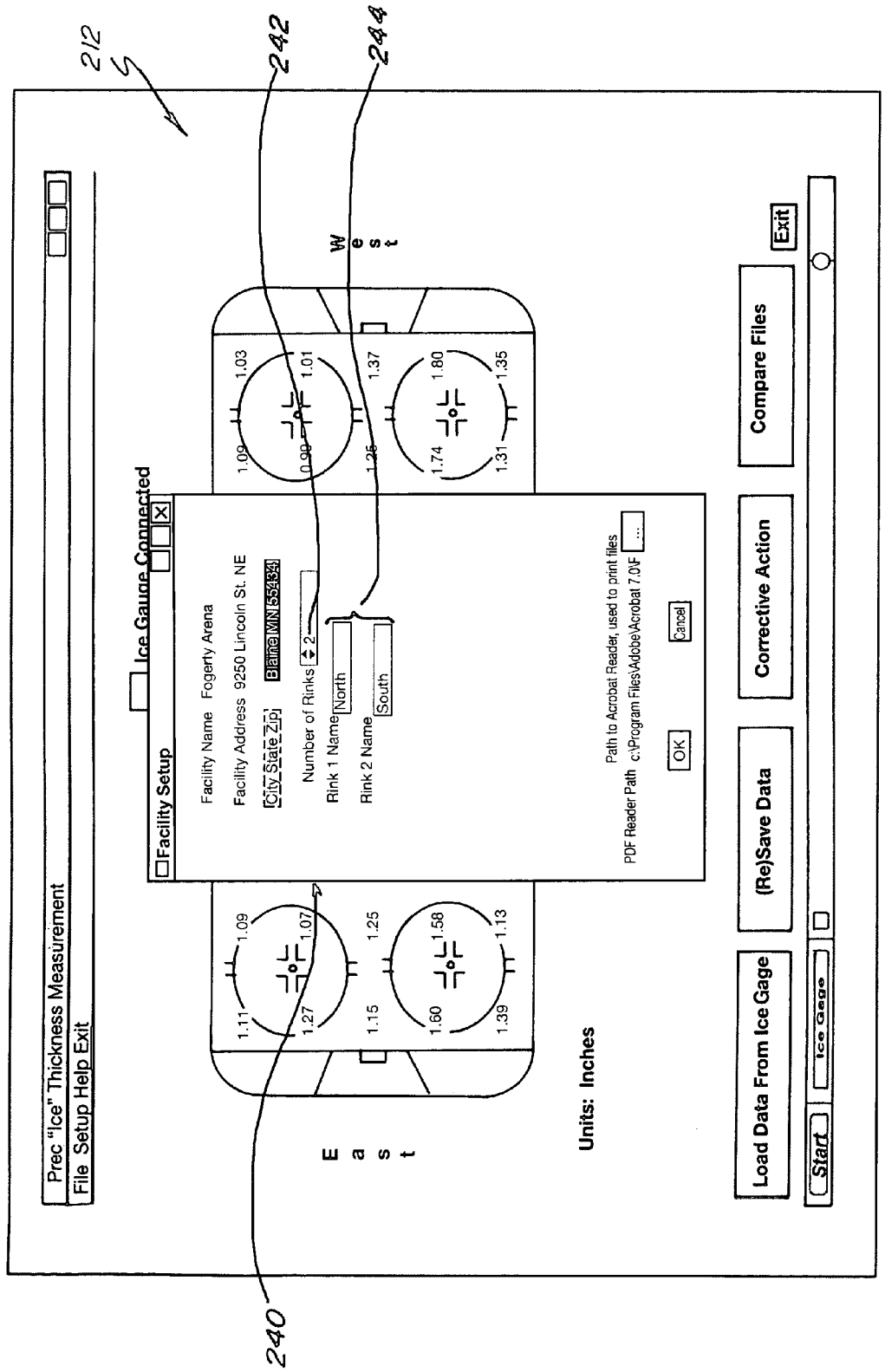
Figure 22E:
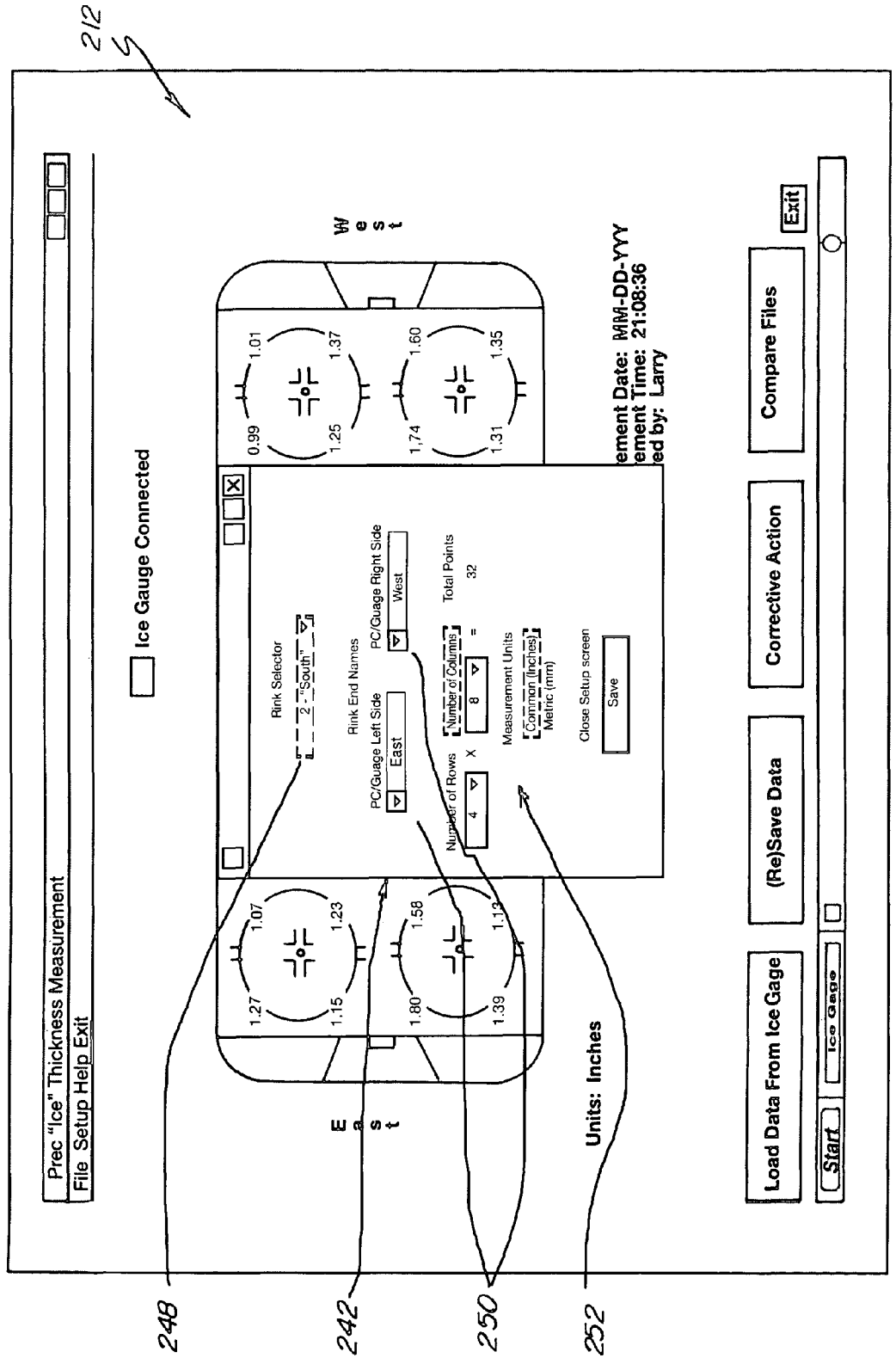

Referring to FIGS. 22C through 22E, some of the operating interfaces accessible from the various menus are depicted by way of example. A print selection interface 238 is depicted in FIG. 22C in an embodiment of the invention, and may include a "Direct History" scrollbar 236 for ready access to files that were more recently uploaded to the computer 62. In addition, the print selection interface 238 may include access to all or a portion of the files in the computer 62, and may be configured to default to directories that are particularly pertinent to the ice thickness measurement system 20, such as tool configuration files and acquired data files.

A facility configuration interface 240 and an individual rink configuration interface 242 are depicted in FIGS. 22D and 22E, respectively. The facility configuration interface 240 may include a general description of the facility, such as an address, and may further include a numeric selector 244 for entering the number of rinks at the facility as well as identification entries 246 for providing a unique name to each of the rinks.

Characterization of each individual rink may be accomplished through the individual rink configuration interface 242, and may include a rink selection scroll bar 248 that includes the rink identification entries 246, as well as rink end identifiers 250. In the depicted embodiment, there are controls 252 for entering the number of columns and rows for the polling matrix, as well as for selecting the units of display. In some embodiments, the information entered via the configuration interfaces 240, 242 is not only applied to the display on the main computer display interface 212, but may be downloaded to the probe assembly 80 and be utilized in generating graphics and/or text on the display panel 96.

The function selectors 222a through 222b may be provided for alternative access to more frequently used functions, thus bypassing or substituting for certain menu entries. Selector 222a, for example, initiates instructions that upload data from the probe assembly 80. Selector 222b in the depiction initiates the saving of the downloaded data to a file on the computer 62. The selector 222e may provide a shortcut to an exit routine that terminates the routines for the ice thickness measurement system 20.

Figure 22F:
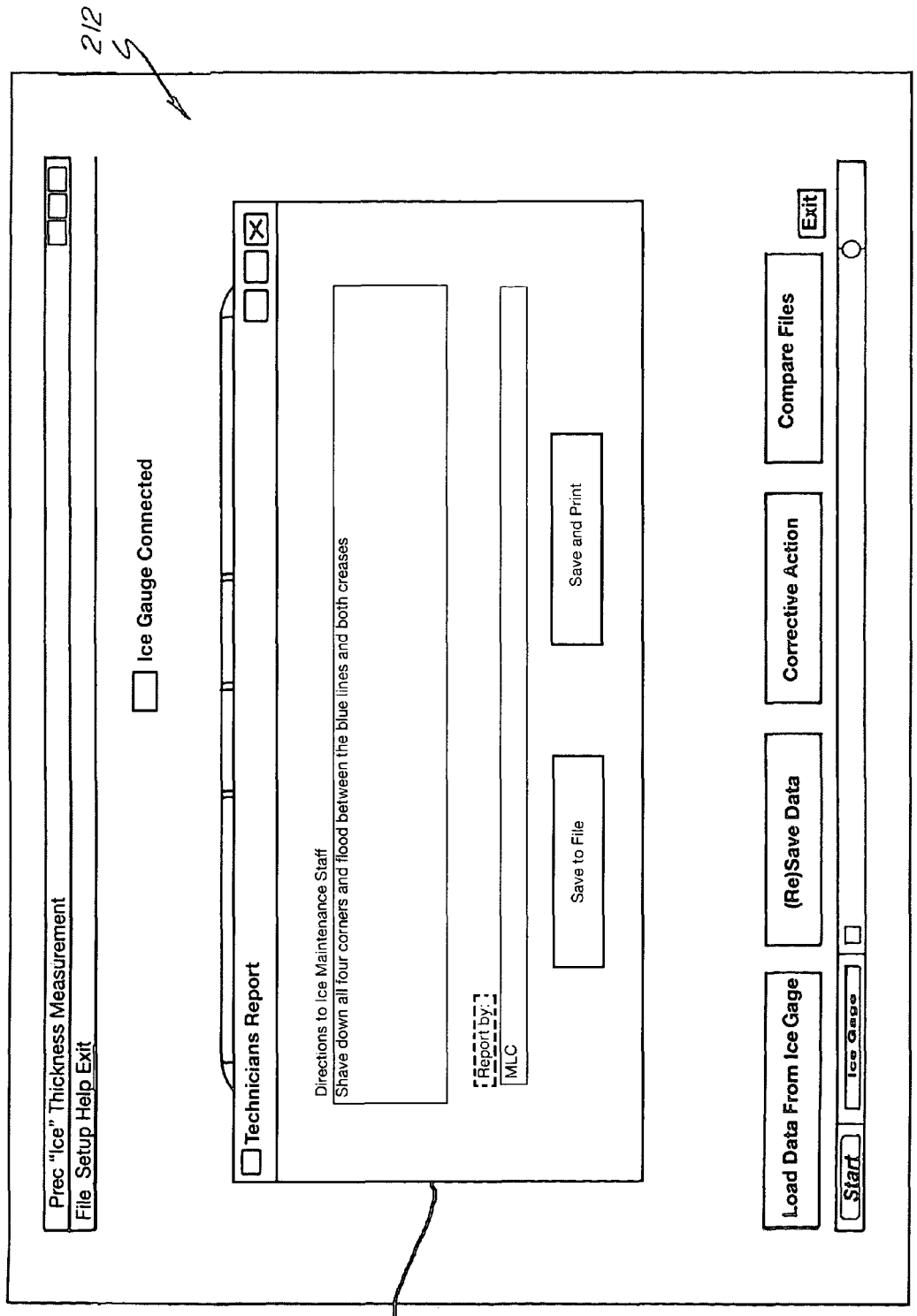
Figure 22G:
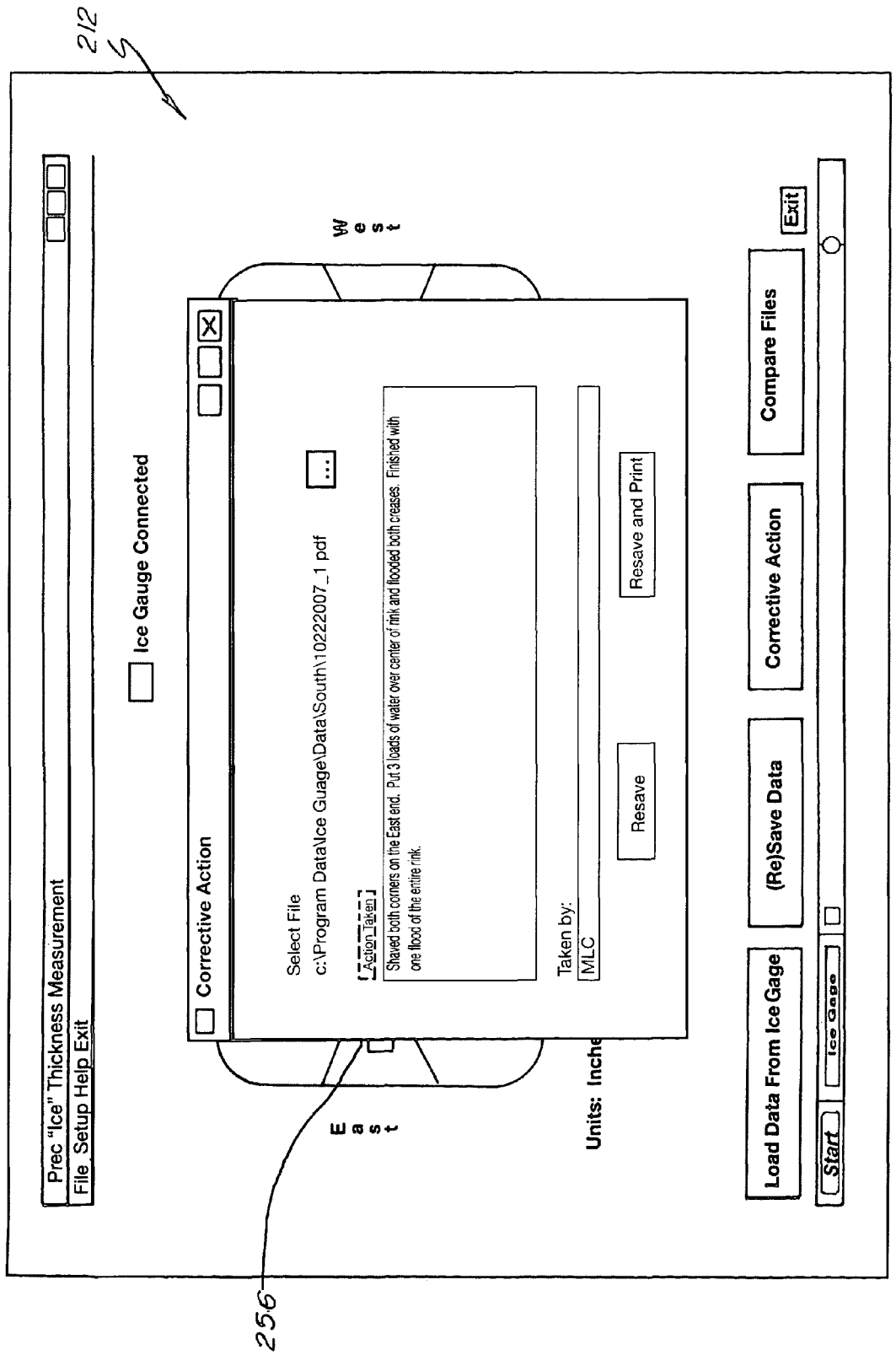

Referring to FIGS. 22F and 22G, examples of how the selectors 222b and 222c may interact with the computer operator are depicted. In one embodiment, actuation of the "(Re)Save" selector 222b may cause an technicians report interface 254 (FIG. 22F) to appear on the monitor 63, thereby reminding the operator to include instructions to maintenance staff before saving the information displayed on the main computer display interface 212. The content of the report may be saved in a report or memo field on the computer 62. The report may be subsequently accessed by rink maintenance personnel. Actuation of the corrective action selector 222c may access entry routines that prompt a the rink maintenance personnel or technician to enter a description of corrective actions that have been taken via a corrective action interface 256 (FIG. 22G). The information entered by the technician may be stored in a second memo field on the computer 62.

Figure 22H:
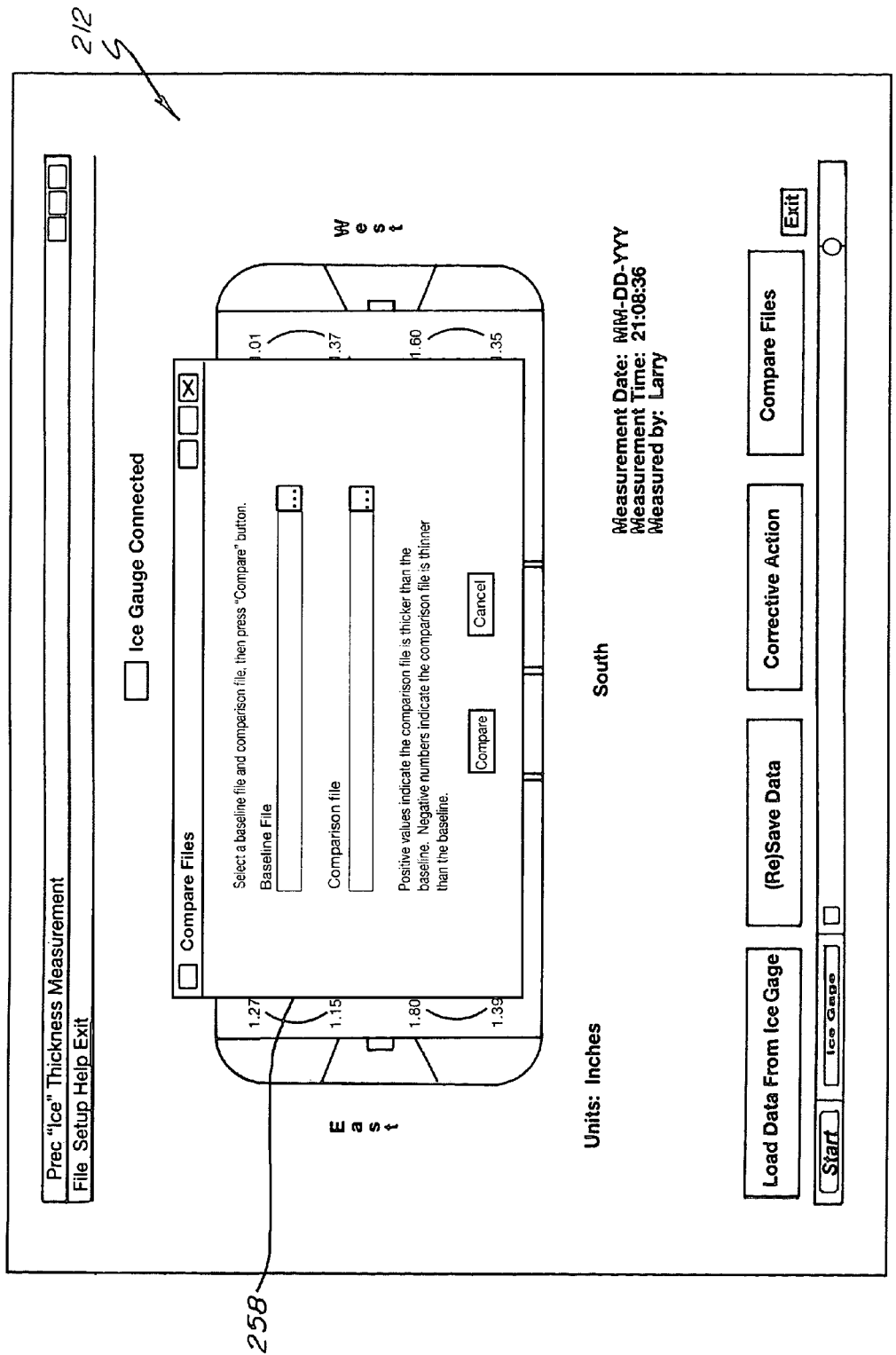

Referring to FIG. 22H, a compare files interface 258 is depicted in an embodiment of the invention. Selector 222d can be utilized to initiate a compare files routine that displays the compare files interface 258. The compare files routine may be utilized to compare thickness values of separate surveys, such as comparing a more recent ice thickness survey against a baseline survey.

As an example, the baseline survey may be taken when the rink is first formed, and compared against subsequent surveys to establish a history of rink wear patterns and maintenance issues. Comparison of data in this way may provide indicia of problems with the refrigeration system in a certain locale of the rink, and/or provide the rink manager with knowledge that helps him establish a more proactive role in addressing rink thickness issues. The results of the compare files operation may be presented on the main display of FIG. 21, with positive values indicating growth of the ice thickness relative to the baseline values, and negative values indicating a thinning or erosion of the ice thickness relative to the baseline values.

Referring to FIG. 22I, a summary report 260 that compiles the pertinent parameters related to a specific survey is depicted in an embodiment of the invention. The summary report may include a graphic presentation 262 of the rink thickness data, along with arena information 264, specific rink information 266, test measurement date and time information 268, directions that were provided to the maintenance staff 270, and corrective actions 272 that may have been implemented. The report may be generated in a .pdf format so that it may be read electronically by a majority of computer systems. The .pdf file may also be configured to guard against intentional or unintentional overwriting of the data.

Figure 23:
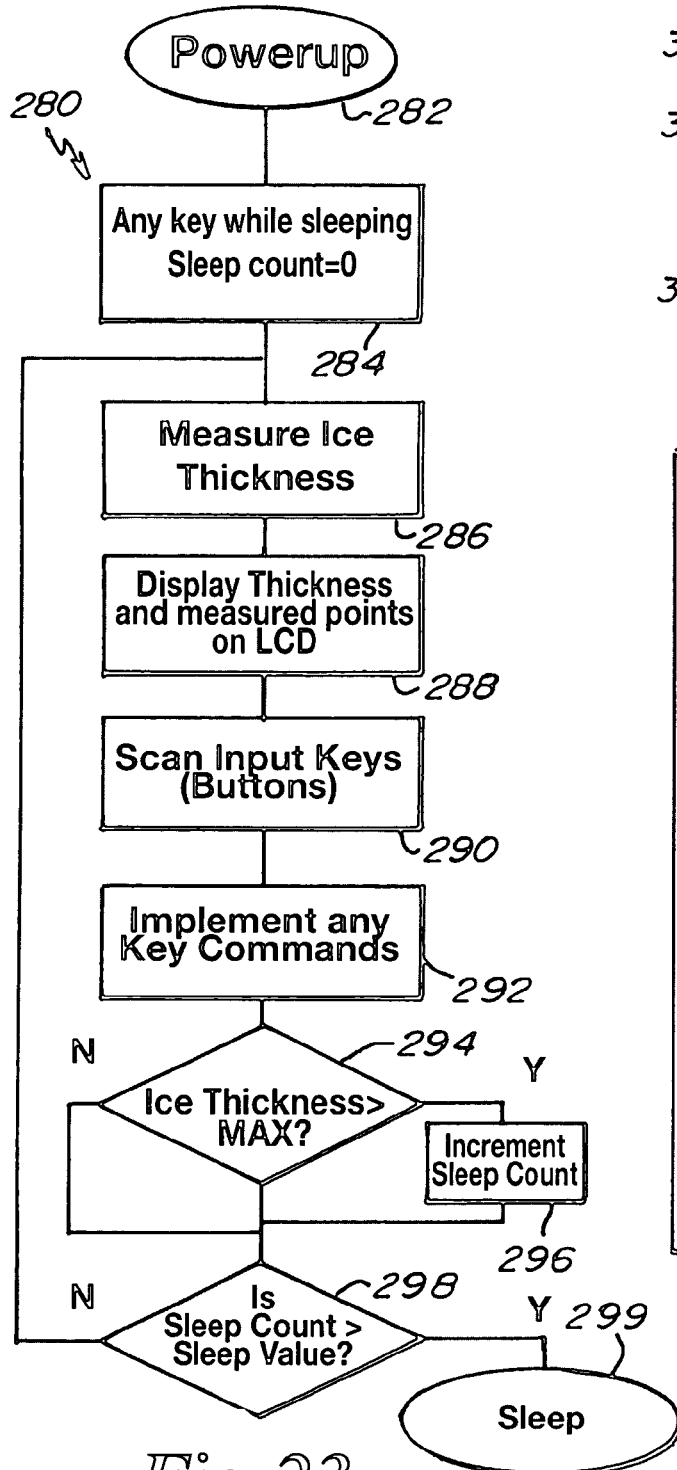
FIG. 23 is a flow chart depicting control of various ice thickness measurement systems in an embodiment of the invention.

Referring to FIG. 23, a main instruction set 280 for operating the probe assembly 80 is depicted in an embodiment of the invention. The various instructions and routines for one embodiment of the invention are provided on the compact disc that is included with this application as an example. In some embodiments, a power up sequence 282 may cause the probe assembly 80 to run continuously. That is, the probe assembly 80 may continuously transmit and receive acoustical signals and convert the results to display a thickness. To preserve battery power, the operating time may be limited such that if the operator does not manipulate the controls 94 for a predetermined time interval (e.g. 40 seconds), the unit can power down or go into a sleep mode.

Accordingly, upon entering the main instruction set 280, a sleep count reset instruction 284 of the main instruction set 280 may initialize a sleep count to zero. A data acquisition routine 286 may then acquire an ice thickness measurement and display the value on the display panel 96 utilizing a display thickness routine 288. The display thickness routine 288 can be configured to indicate on a display interface that a thickness has been measured at a certain polling position, such as depicted in FIG. 20A. The main instruction set 280 may then perform a scan routine 290 and a set of implementation instructions 292 wherein the status of the user controls 94 are checked and the appropriate instructions are executed based on the detected manipulation of the user controls 94.

For embodiments of the invention where the probe assembly 80 continuously transmits, receives and converts acoustical signals into thicknesses, the probe assembly 80 may resolve a measurement that is meaningless for its purpose. For example, the probe assembly 80 may be laying on its side and on the order of a meter from the nearest reflecting surface. The combination of increased distance and decreased sonic velocity through a gas (air) will tend to make the measurement substantially larger than would be encountered in an actual polling measurement. Accordingly, a logic instruction 294 may be included whereby the thickness is compared with some predetermined maximum (referred to as MAX in FIG. 23) that is known to be outside the range of any reasonable ice thickness measurement (e.g. 250-mm). If the resolved thickness measurement is greater than the predetermined value, an increment instruction 296 is executed to increment the sleep count. A sleep count comparison instruction 298 that compares the sleep count with a predetermined count value known to approximate a certain lapse of time. If the sleep count exceeds the predetermined count value, the probe assembly 80 goes into a sleep mode 299 wherein electronic operation of the probe assembly 80 is suspended.

Other variations of the logic presented above may be included or substituted by an artisan of ordinary skill and still be practicing the disclosed invention, for example using a count decrement scheme rather than the count increment scheme depicted, or comparing lapsed time since the sleep count reset instruction 284 by way of a clocking device rather than by count incrementation/decrementation.

Figure 24:
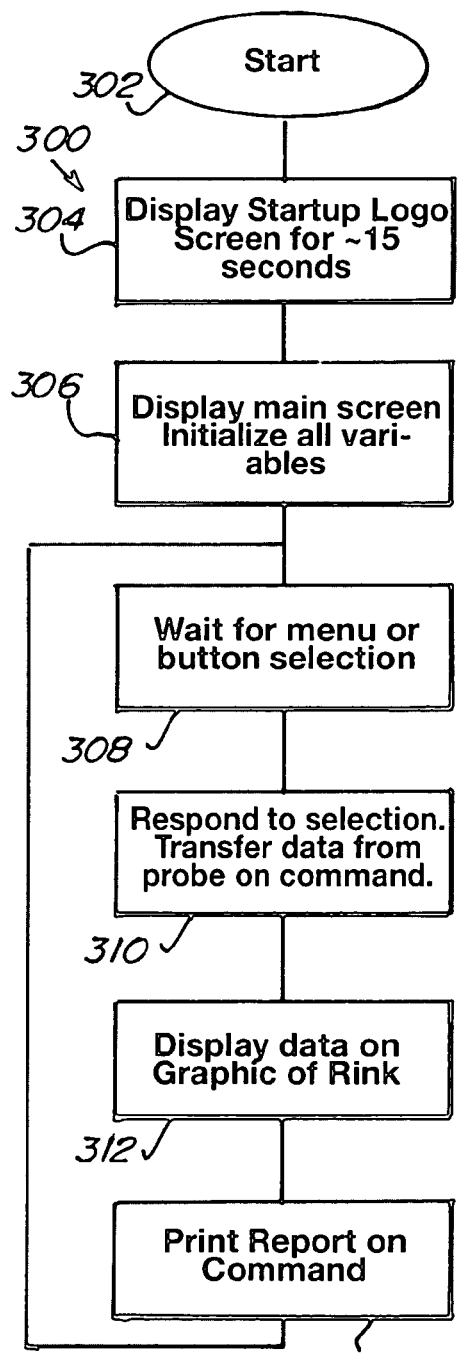
FIGS. 24 and 25 are flow charts depicting computer instructions for interfacing the ice thickness gauge with a computer in an embodiment of the invention.

Referring to FIG. 24, a computer interaction instruction set 300 for operating the ice thickness measurement system 20 is depicted in an embodiment of the invention. After startup 302, the computer interaction instruction set 300 may enter a logo display routine 304 for displaying a logo on the monitor 63. The logo display routine 304 may include a time delay (e.g. 15 seconds) for posting of the logo. A main display and initialization routine 306 may also be executed, which may upload existing facility and/or rink information from the memory of the computer 62, and may include instructions to guide the user through entering new facility/rink information.

Figure 22:
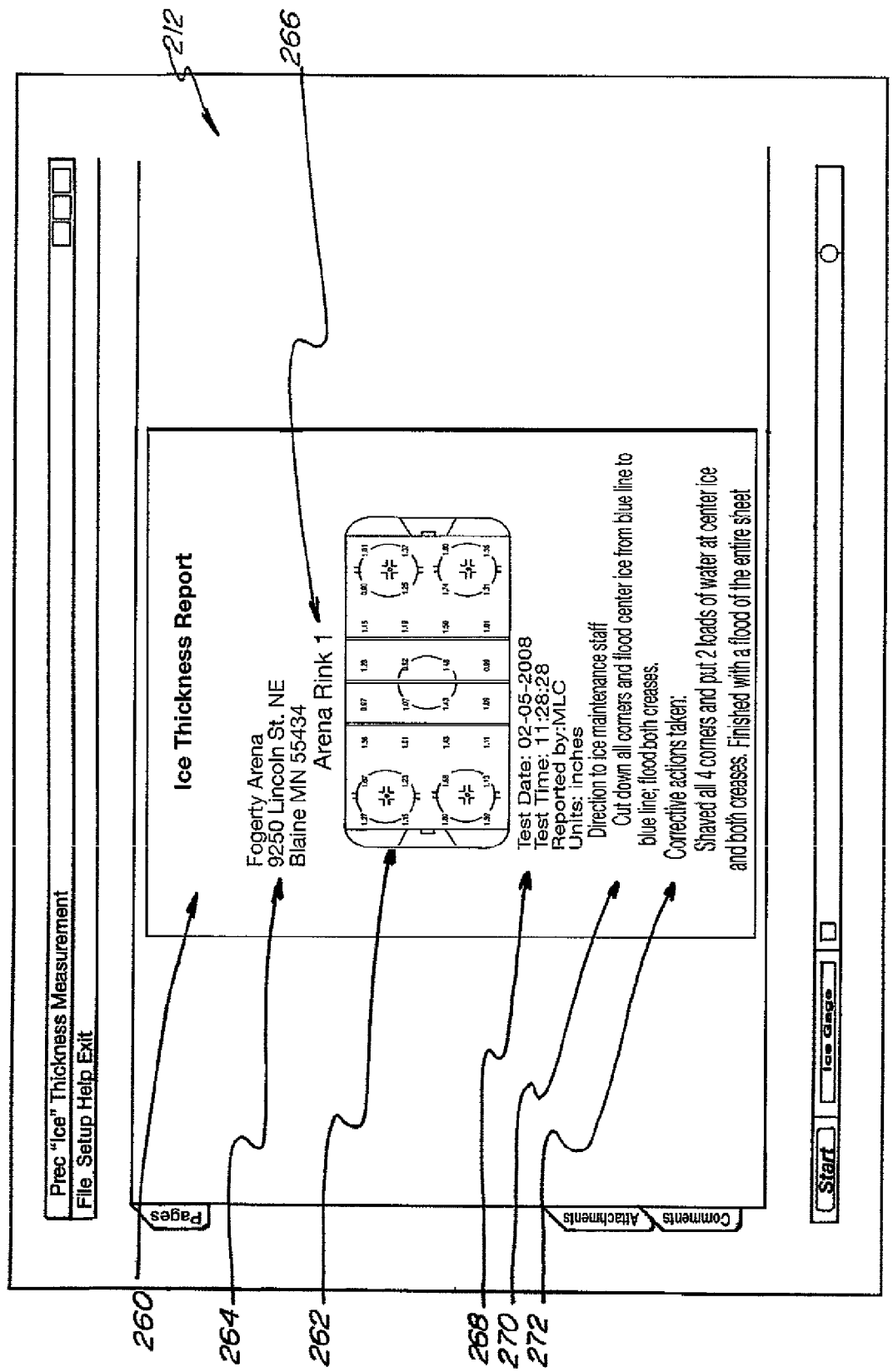

In the depicted embodiment, the computer interaction instruction set 300 executes a waiting routine 308 wherein the main instruction set awaits an operator instruction from the computer 62. A response routine 310 may be executed upon receiving the operator instruction, such as navigating through the various menu selections described in FIG. 22 or receiving input from the computer 62 or the probe assembly 80. This response routine 310 may include instructions to upload ice thickness data from the memory device 50. A graphic display routine 312 may also display the thickness data on a graphic display of the rink, such as depicted in FIG. 21. A print routine 314 may instruct the data to be displayed in various forms on a hard copy and/or stored electronically on a remote computer (e.g. FIG. 22I).

Figure 25:
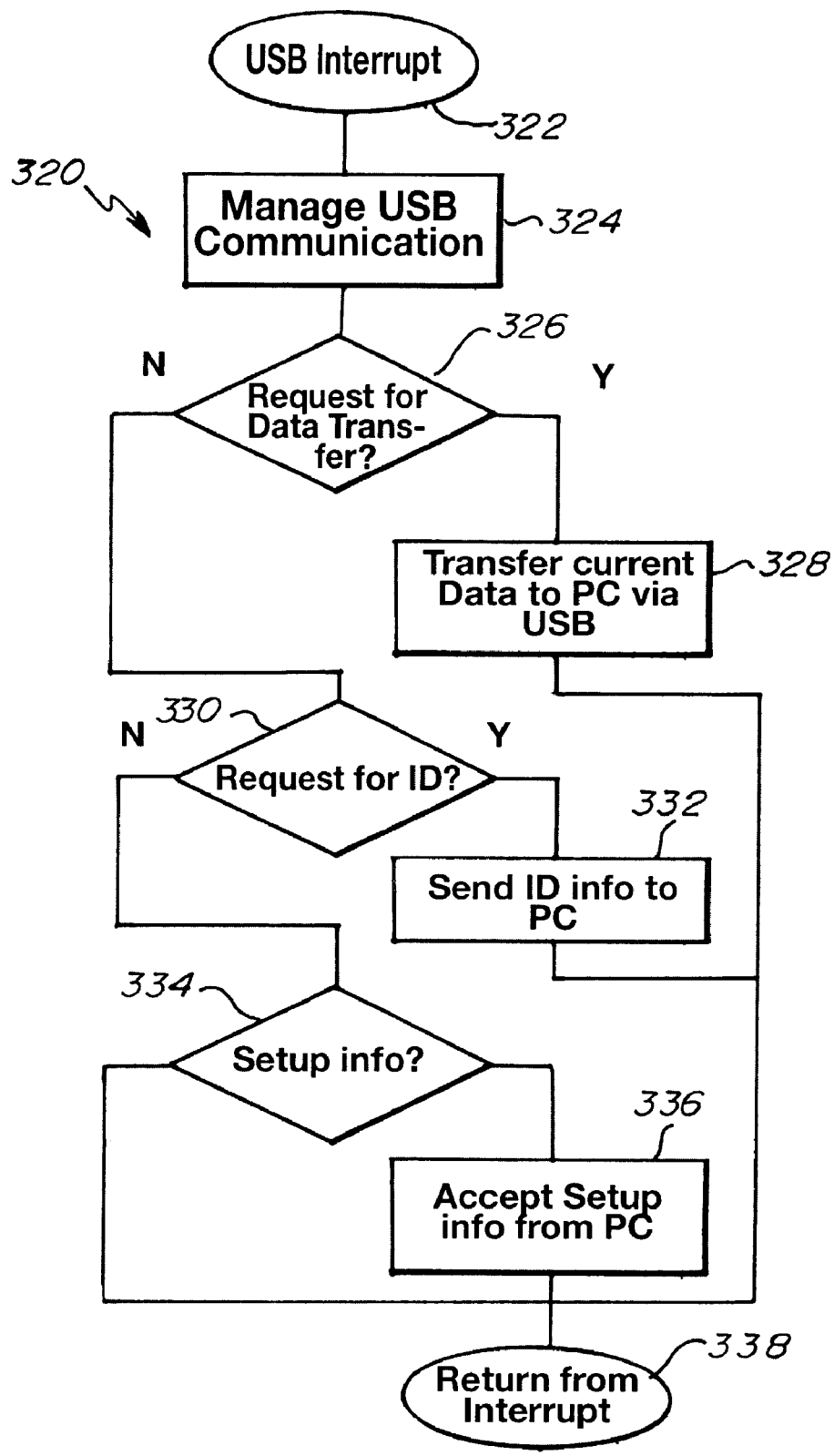

Referring to FIG. 25, an interrupt routine 320 for interrupting the operation of the probe assembly 80 to communicate with the computer 62 is diagrammatically depicted in an embodiment of the invention. In this embodiment, an interrupt 322 is received by the probe assembly 80, which initiates communications management routines 324, such as those commercially available for management USB communications. The interrupt routine may include a plurality of inquiries to determine what kind of information is being transferred. For example, a data transfer query 326 may inquire or check to see if the information about to be transferred is ice thickness data, in which case a routine 328 would be executed transfer data from the probe assembly 80 to the computer 62. An identification query 330 may also be executed that checks if the computer 62 is requesting information that identifies the data being sent, in which case an ID transfer routine 332 may be executed to accomplish the transfer. A setup query 334 may also be included that tells the probe assembly that the computer 62 is about to transfer setup information to the probe assembly 80. A setup read routine 336 may then be implemented to accept the setup information and write it into the memory device 50 of the probe assembly 80. Upon executing any of the query response routines 328, 332 or 336, or if all the queries 326, 330 or 334 discern a negative result, an interrupt return sequence 338 may terminate the interrupt and the probe assembly 80 allowed to continue in normal operation.

The foregoing examples and attendant Figure indicate the use of USB communications. However, other communication devices such as standard serial or parallel ports, Ethernet connections, PCMCIA ports or wireless ports may be implemented.

References to relative terms such as upper and lower, front and back, left and right, or the like, are intended for convenience of description and are not contemplated to limit the present invention, or its components, to any specific orientation. All dimensions depicted in the figures may vary with a potential design and the intended use of a specific embodiment of this invention without departing from the scope thereof.

Because various modifications, substitutions, and changes of this invention may be made by one of skill in the art without departing from the spirit thereof, the invention is not limited to the embodiments illustrated and described herein. Each of the additional figures and methods disclosed herein may be used separately, or in conjunction with other features and methods, to provide improved systems and methods for making and using the same. Therefore, combinations of features and methods disclosed herein may not be necessary to practice the invention in its broadest sense and are instead disclosed merely to particularly describe representative and preferred embodiments of the instant invention. Accordingly, the scope of the invention is to be determined by the appended claims and their equivalents.

For purposes of interpreting the claims for the present invention, it is expressly intended that the provisions of Section 112, sixth paragraph of 35 U.S.C. are not to be invoked unless the specific terms "means for" or "steps for" are recited in the subject claim.

What is claimed is:

1. A system for surveying the thickness of an ice rink, comprising:
    an acoustical device configured to measure a thickness of said ice rink, said acoustical device being controlled by a microprocessor;
    controls for operator communication with said microprocessor;
    a display panel operatively coupled with said microprocessor; and
    at least one memory device in communication with said microprocessor and including a writeable memory for storage of electronic data acquired by said acoustical device, said at least one memory device further including instructions executable by said microprocessor for control of said acoustical device, said instructions comprising:
    detecting a trigger;
    measuring said thickness in response to said trigger;
    writing a value of said thickness measurement to said writable memory;
    displaying a depiction of at least a portion of said ice rink on said display panel; and
    indicating on said display panel a location on said ice rink for taking said thickness measurement.

2. A system for surveying the thickness of an ice rink, comprising:
    an acoustical device configured to measure a thickness of said ice rink, said acoustical device being controlled by a microprocessor;
    controls for operator communication with said microprocessor;
    a display panel operatively coupled with said microprocessor; and at least one memory device in communication with said microprocessor and including a writeable memory for storage of electronic data acquired by said acoustical device, said at least one memory device including instructions executable by said microprocessor for control of said acoustical device, said instructions comprising:

detecting a trigger;

measuring said thickness in response to said trigger;

writing a value of said thickness measurement to said writable memory;

displaying a depiction of at least a portion of said ice rink on said display panel; and receiving an indication of where on said ice rink said thickness measurement is being taken.

* * * * *